US012784667B2

(12) United States Patent
Lee et al.

(10) Patent No.: US 12,784,667 B2
(45) Date of Patent: Nov. 3, 2026

(54) PIXEL CIRCUIT, DISPLAY DEVICE INCLUDING THE PIXEL CIRCUIT, AND ELECTRONIC DEVICE INCLUDING THE DISPLAY DEVICE

(71) Applicant: Samsung Display Co., LTD., Yongin-si (KR)

(72) Inventors: Sehyun Lee, Yongin-si (KR); Kwihyun Kim, Yongin-si (KR); Kihyun Pyo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/355,134

(22) Filed: Oct. 10, 2025

(65) Prior Publication Data

US 2026/0171005 A1 Jun. 18, 2026

(30) Foreign Application Priority Data

Dec. 18, 2024 (KR) ........................ 10-2024-0190281

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01);
(Continued)

(58) Field of Classification Search
CPC .............. G06F 3/32; G09G 2300/0819; G09G 2300/0852; G09G 2300/0861;
(Continued)

(56) References Cited

U.S. PATENT DOCUMENTS

2023/0237954 A1* 7/2023 Lee ........................ G06F 3/1446 345/206
2024/0038170 A1* 2/2024 Zhai ..................... G09G 3/3233
(Continued)

FOREIGN PATENT DOCUMENTS

KR 1020220052265 A 4/2022

OTHER PUBLICATIONS

Richter et al., "OLED-on-CMOS based bidirectional microdisplay for near-to-eye and sensor applications," IEEE Xplore, Dec. 5, 2024, 3 pages.

*Primary Examiner* — Peter D Mcloone
(74) *Attorney, Agent, or Firm* — CANTOR COLBURN LLP

(57) ABSTRACT

A display device may include a first circuit which performs a pulse width modulation operation based on a pulse width modulation data voltage, a second circuit which generates a driving current based on a constant-current voltage, and a light emitting element which emits light based on the pulse width modulation data voltage and the constant-current voltage. The first circuit may include a first transistor, a second transistor which transmits the pulse width modulation data voltage to the first transistor, and a third transistor which diode-connects the first transistor. The second circuit may include a seventh transistor, an eighth transistor which transmits the constant-current voltage to the seventh transistor, and a third capacitor including a first electrode connected to the seventh transistor and a second electrode which receives a stabilization voltage.

20 Claims, 21 Drawing Sheets

(52) U.S. Cl.
CPC . *G09G 2300/0861* (2013.01); *G09G 2310/08* (2013.01); *G09G 2320/0238* (2013.01); *G09G 2320/045* (2013.01)

(58) Field of Classification Search
CPC ....... G09G 2310/08; G09G 2320/0238; G09G 2320/045
See application file for complete search history.

(56) References Cited

U.S. PATENT DOCUMENTS

| | | | | |
|---|---|---|---|---|
| 2025/0037659 | A1* | 1/2025 | Xu | G09G 3/3233 |
| 2025/0078730 | A1* | 3/2025 | Lee | G09G 3/2014 |

* cited by examiner

PIXEL CIRCUIT, DISPLAY DEVICE INCLUDING THE PIXEL CIRCUIT, AND ELECTRONIC DEVICE INCLUDING THE DISPLAY DEVICE

This application claims priority to Korean Patent Application No. 10-2024-0190281, filed on Dec. 18, 2024, and all the benefits accruing therefrom under 35 U.S.C. § 119, the content of which in its entirety is herein incorporated by reference.

BACKGROUND

1. Field

Embodiments supported by aspects of the present disclosure relate to a pixel circuit, a display device including the pixel circuit, and an electronic device including the display device.

2. Description of the Related Art

Generally, a display device includes a display panel and a display panel driver. The display panel may include gate lines, data lines, and pixels. The display panel driver may include a gate driver which provides gate signal to the gate lines, a data driver which provides a data voltage to the data lines, and a driving controller which control the gate driver and the data driver.

A pixel circuit which is driven by a conventional pulse width modulation (PWM) method and performing internal compensation of a threshold voltage may include more than nineteen transistors and more than three capacitors. Due to limitations in integration density, it may be difficult to apply such a configuration to ultra-high-resolution display devices.

SUMMARY

An object of the present disclosure is to provide a pixel circuit which is driven by a pulse width modulation method, performs internal compensation of a threshold voltage, includes a relatively small number of transistors, and is applicable to ultra-high-resolution display devices.

Another object of the present disclosure is to provide a display device including the pixel circuit.

Still another object of the present disclosure is to provide an electronic device including the display device.

However, objects of the present disclosure are not limited to the above objects, and may be variously extended without departing from the spirit and scope of the present disclosure.

According to embodiments, a pixel circuit may include a first circuit which performs a pulse width modulation operation based on a pulse width modulation data voltage, a second circuit which generates a driving current based on a constant-current voltage, and a light emitting element which emits light based on the pulse width modulation data voltage and the constant-current voltage. The first circuit may include a first transistor including a control electrode connected to a first node, a first electrode connected to a second node, and a second electrode connected to a third node, a second transistor which transmits the pulse width modulation data voltage to the second node, and a third transistor connected to the first node and the third node, and the second circuit may include a seventh transistor including a control electrode connected to a fourth node, a first electrode connected to a fifth node, and a second electrode connected to an anode of the light emitting element, an eighth transistor which transmits the constant-current voltage to the fourth node, and a third capacitor including a first electrode connected to the fourth node and a second electrode which receives a stabilization voltage.

In an embodiment, the second transistor may include a control electrode which receives a first writing gate signal, a first electrode connected to a data voltage terminal, and a second electrode connected to the third node, and the eighth transistor may include a control electrode which receives a second writing gate signal, a first electrode connected to the data voltage terminal, and a second electrode connected to the fourth node.

In an embodiment, the second circuit may further include a second capacitor including a first electrode connected to the fifth node and a second electrode connected to the fourth node.

In an embodiment, the second circuit may further include a tenth transistor including a control electrode which receives a third initialization gate signal, a first electrode connected to the anode of the light emitting element, and a second electrode which receives a second initialization voltage.

In an embodiment, the second electrode of the third capacitor may be connected to the control electrode of the tenth transistor, and the stabilization voltage may be the third initialization gate signal.

In an embodiment, the first circuit may further include a fourth transistor including a control electrode which receives a first initialization gate signal, a first electrode connected to the first node, and a second electrode which receives a first initialization voltage.

In an embodiment, the first circuit may further include a first capacitor including a first electrode which receives a sweep signal and a second electrode connected to the first node.

In an embodiment, the second circuit may further include an eleventh transistor including a control electrode which receives a second initialization gate signal, a first electrode connected to the fourth node, and a second electrode which receives a first initialization voltage.

In an embodiment, the first circuit further may include a fifth transistor including a control electrode which receives an emission signal, a first electrode which receives a first power supply voltage, and a second electrode connected to the second node, a sixth transistor including a control electrode which receives the emission signal, a first electrode connected to the third node, and a second electrode connected to the fourth node, and a ninth transistor including a control electrode, a first electrode which receives a second power supply voltage, and a second electrode connected to the fifth node.

In an embodiment, the control electrode of the ninth transistor may receive the emission signal.

In an embodiment, the eighth transistor may include a control electrode which receives a second writing gate signal, a first electrode connected to a data voltage terminal, and a second electrode connected to the fourth node, and the control electrode of the ninth transistor may receive the second writing gate signal.

In an embodiment, the second transistor may include a control electrode which receives a first writing gate signal, a first electrode connected to a data voltage terminal, and a second electrode connected to the second node, the third transistor may include a control electrode which receives a compensation gate signal, a first electrode connected to the first node, and a second electrode connected to the third node, the eighth transistor may include a control electrode which receives a second writing gate signal, a first electrode connected to the data voltage terminal, and a second electrode connected to the fourth node, the light emitting element may include the anode and a cathode which receives a third power supply voltage, wherein the first circuit may further include a fourth transistor including a control electrode which receives a first initialization gate signal, a first electrode connected to the first node, and a second electrode which receives a first initialization voltage, a fifth transistor including a control electrode which receives an emission signal, a first electrode which receives a first power supply voltage, and a second electrode connected to the second node, a sixth transistor including a control electrode which receives the emission signal, a first electrode connected to the third node, and a second electrode connected to the fourth node, and a first capacitor including a first electrode which receives a sweep signal and a second electrode connected to the first node, and the second circuit may further include a ninth transistor including a control electrode which receives the emission signal, a first electrode which receives a second power supply voltage, and a second electrode connected to the fifth node, a tenth transistor including a control electrode which receives a third initialization gate signal, a first electrode connected to the anode of the light emitting element, and a second electrode which receives a second initialization voltage, an eleventh transistor including a control electrode which receives a second initialization gate signal, a first electrode connected to the fourth node, and a second electrode which receives the first initialization voltage, and a second capacitor including a first electrode connected to the fifth node and a second electrode connected to the fourth node.

In an embodiment, in a first period, the first initialization gate signal may have an activation level, the second initialization gate signal may have a deactivation level, the third initialization gate signal may have an activation level, the first writing gate signal may have a deactivation level, the second writing gate signal may have a deactivation level, the compensation gate signal may have a deactivation level, the emission signal may have a deactivation level, and the sweep signal may have a high level.

In an embodiment, in a second period, the first initialization gate signal may have a deactivation level, the second initialization gate signal may have a deactivation level, the third initialization gate signal may have an activation level, the first writing gate signal may have an activation level, the second writing gate signal may have a deactivation level, the compensation gate signal may have an activation level, the emission signal may have a deactivation level, the sweep signal may have a high level, a data voltage, which is applied to the data voltage terminal, may have a first level, and the data voltage having the first level may be the pulse width modulation data voltage.

In an embodiment, in a third period, the first initialization gate signal may have a deactivation level, the second initialization gate signal may have an activation level, the third initialization gate signal may have an activation level, the first writing gate signal may have a deactivation level, the second writing gate signal may have a deactivation level, the compensation gate signal may have a deactivation level, the emission signal may have an activation level, the sweep signal may have a high level, a data voltage, which is applied to the data voltage terminal, may have a second level, and the data voltage having the second level may be the constant-current voltage.

In an embodiment, in a fourth period, the first initialization gate signal may have a deactivation level, the second initialization gate signal may have a deactivation level, the third initialization gate signal may have an activation level, the first writing gate signal may have a deactivation level, the second writing gate signal may have an activation level, the compensation gate signal may have a deactivation level, the emission signal may have a deactivation level, the sweep signal may have a high level, a data voltage, which is applied to the data voltage terminal, may have a second level, and the data voltage having the second level may be the constant-current voltage.

In an embodiment, in a fifth period and a sixth period, the first initialization gate signal may have a deactivation level, the second initialization gate signal may have a deactivation level, the third initialization gate signal may have a deactivation level, the first writing gate signal may have a deactivation level, the second writing gate signal may have a deactivation level, the compensation gate signal may have a deactivation level, the emission signal may have an activation level, and the sweep signal may gradually decrease from a high level.

According to embodiments, a display device may include a display panel including a pixel circuit, a gate driver which provides a gate signal to the pixel circuit, an emission driver which provides an emission signal to the pixel circuit, and a data driver which provides a data voltage to the pixel circuit. The pixel circuit may include a first circuit which performs a pulse width modulation operation based on a pulse width modulation data voltage, a second circuit which generates a driving current based on a constant-current voltage, and a light emitting element which emits light based on the pulse width modulation data voltage and the constant-current voltage, the first circuit may include a first transistor including a control electrode connected to a first node, a first electrode connected to a second node, and a second electrode connected to a third node, a second transistor which transmits the pulse width modulation data voltage to the second node, and a third transistor connected to the first node and the third node, and the second circuit may include a seventh transistor including a control electrode connected to a fourth node, a first electrode connected to a fifth node, and a second electrode connected to an anode of the light emitting element, an eighth transistor which transmits the constant-current voltage to the fourth node, and a third capacitor including a first electrode connected to the fourth node and a second electrode which receives a stabilization voltage.

In an embodiment, the second transistor may include a control electrode which receives a first writing gate signal, a first electrode which receives the data voltage, and a second electrode connected to the second node, the third transistor may include a control electrode which receives a compensation gate signal, a first electrode connected to the first node, and a second electrode connected to the third node, the eighth transistor may include a control electrode which receives a second writing gate signal, a first electrode which receives the data voltage, and a second electrode connected to the fourth node, the light emitting element may include the anode and a cathode which receives a third power supply voltage, the first circuit further may include a fourth transistor including a control electrode which receives a first initialization gate signal, a first electrode connected to the first node, and a second electrode which receives a first initialization voltage, a fifth transistor including a control electrode which receives the emission signal, a first electrode which receives a first power supply voltage, and a second electrode connected to the second node, a sixth transistor including a control electrode which receives the emission signal, a first electrode connected to the third node, and a second electrode connected to the fourth node, and a first capacitor including a first electrode which receives a sweep signal and a second electrode connected to the first node, and the second circuit may further include a ninth transistor including a control electrode which receives the emission signal, a first electrode which receives a second power supply voltage, and a second electrode connected to the fifth node, a tenth transistor including a control electrode which receives a third initialization gate signal, a first electrode connected to the anode of the light emitting element, and a second electrode which receives a second initialization voltage, an eleventh transistor including a control electrode which receives a second initialization gate signal, a first electrode connected to the fourth node, and a second electrode which receives the first initialization voltage, and a second capacitor including a first electrode connected to the fifth node and a second electrode connected to the fourth node.

According to embodiments, an electronic device may include a processor which generates an input control signal and input image data, a display panel including a pixel circuit, and a display panel driver which operates the display panel based on the input control signal and the input image data. The pixel circuit may include a first circuit which performs a pulse width modulation operation based on a pulse width modulation data voltage, a second circuit which generates a driving current based on a constant-current voltage, and a light emitting element which emits light based on the pulse width modulation data voltage and the constant-current voltage, the first circuit may include a first transistor including a control electrode connected to a first node, a first electrode connected to a second node, and a second electrode connected to a third node, a second transistor which transmits the pulse width modulation data voltage to the second node, and a third transistor connected to the first node and the third node, and the second circuit may include a seventh transistor including a control electrode connected to a fourth node, a first electrode connected to a fifth node, and a second electrode connected to an anode of the light emitting element, an eighth transistor which transmits the constant-current voltage to the fourth node, and a third capacitor including a first electrode connected to the fourth node and a second electrode which receives a stabilization voltage.

Therefore, the pixel circuit may include 11 transistors and 3 capacitors. The pixel circuit may be driven by a pulse width modulation method and may perform an internal compensation for a threshold voltage of the first transistor and a threshold voltage of the seventh transistor. As the pixel circuit has relatively small number of transistors compared to a conventional pixel circuit, an integration density of the pixel circuits included in the display panel may be increased. In an example in which the integration density of the pixel circuits is increased, resolution of the display device may be increased. Accordingly, the pixel circuit may be applicable to an ultra-high resolution display device.

The pixel circuit may include the first circuit and the second circuit. As at least one transistor of the first circuit and at least one transistor of the second circuit are implemented as N-channel metal oxide semiconductor transistors, power consumption of the display device may be reduced.

In some aspects, as the second circuit includes the second capacitor for performing the internal compensation for the threshold voltage of the seventh transistor, the number of the transistors may be decreased.

In some aspects, when the second electrode of the third capacitor included in the second circuit is connected to a stabilization voltage terminal, the stabilization voltage, which is a constant voltage, may be applied to the second electrode of the third capacitor. Accordingly, a coupling of the third capacitor may be prevented. Accordingly, a voltage of the fourth node may be stabilized. Accordingly, stability of the pixel circuit may be improved.

In some aspects, the first transistor included in the first circuit and the seventh transistor included in the second circuit may be implemented as P-channel metal oxide semiconductor transistors. A mobility of the first transistor and a mobility of the seventh transistor may be improved.

In some aspects, as a voltage level of the second initialization voltage for initializing the anode of the light emitting element is lower than a voltage level of the third power supply voltage, a leakage current which flows to the light emitting element may be prevented. Accordingly, a black characteristic of the pixel circuit may be improved.

In some aspects, as the pulse width modulation data voltage applied to the first electrode of the first transistor and the constant-current voltage applied to the control electrode of the seventh transistor are applied to the first circuit or the second circuit through the data voltage terminal, the number of the transistors and the number of signal lines may be decreased. Accordingly, the dead space of the display device may be decreased.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
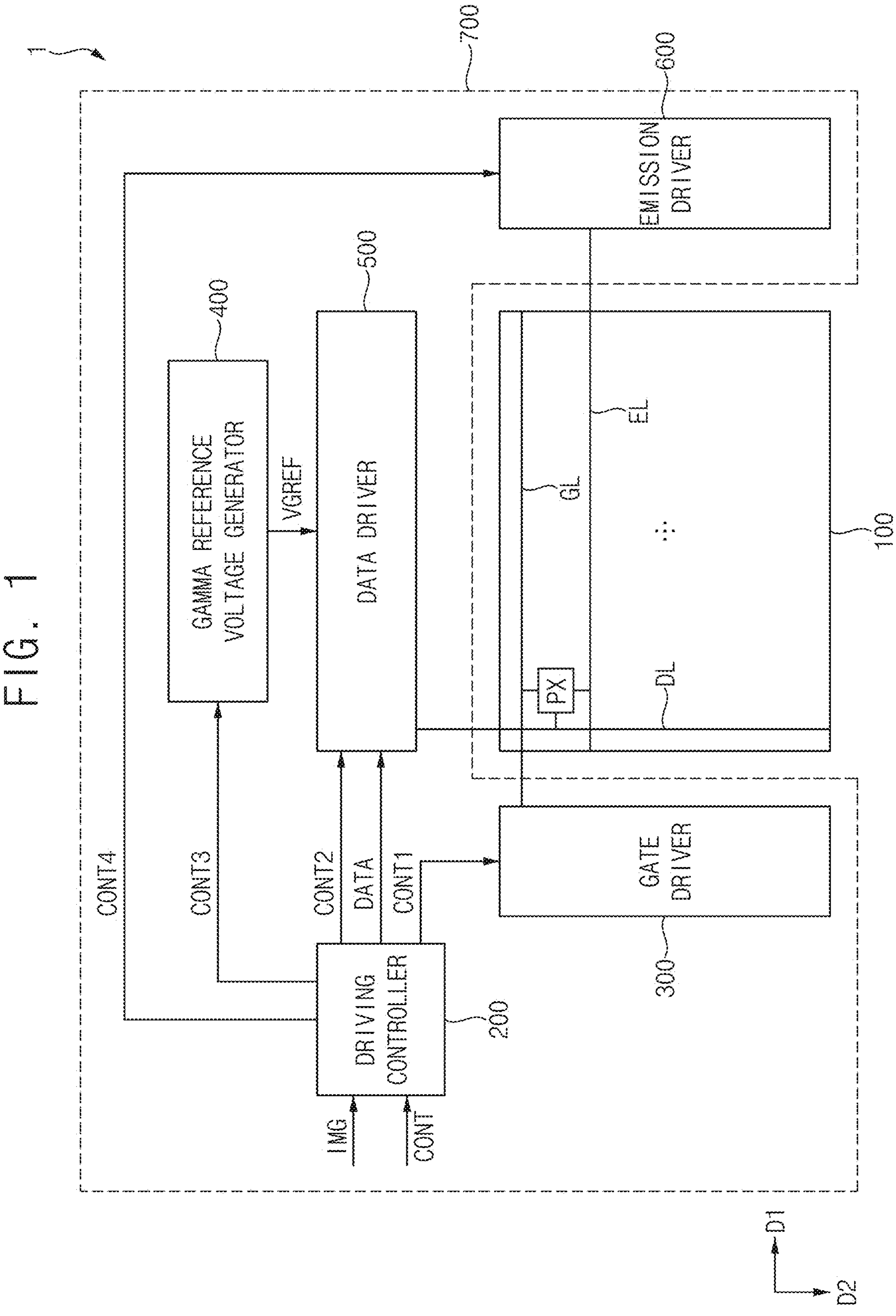
FIG. 1 is a block diagram illustrating a display device according to embodiments.

Hereinafter, display devices in accordance with embodiments will be described in more detail with reference to the accompanying drawings. The same reference numerals are used for the same components in the drawings, and redundant descriptions of the same components will be omitted.

Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, comp The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terms "high level" (or alternatively, "high voltage level") and "low level" (or alternatively, "low voltage level") are relative terms describing levels of voltages. For example, the terms "high level" (or alternatively, "high voltage level") and "low level" (or alternatively, "low voltage level") may refer to levels of voltages which, when applied to a transistor described herein, may activate a transistor (e.g., turn "ON" the transistor) or deactivate a transistor (e.g., turn "OFF" the transistor) based on transistor type (e.g., P-type, N-type, or the like).

The terms "activation level" and "deactivation level" describe levels of voltages which, when applied to a transistor described herein, may activate a transistor (e.g., turn "ON" the transistor) or deactivate a transistor (e.g., turn "OFF" the transistor) based on transistor type (e.g., P-type, N-type, or the like).

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating a display device 1 according to embodiments.

Referring to FIG. 1, the display device 1 may include a display panel 100 and display panel driver. The display panel driver 700 may include a driving controller 200, a gate driver 300, a gamma reference voltage generator 400, a data driver 500, and an emission driver 600.

The display panel 100 may include a display region on which an image is displayed and a peripheral region adjacent to the display region.

The display panel 100 may include gate lines GL, data lines DL, emission lines EL and pixel circuits PX. For example, the gate lines GL may extend in a first direction D1, and the emission lines EL may extend in the first direction D1. The data lines DL may extend in a second direction D2 crossing the first direction D1.

The driving controller 200 may receive input image data IMG and an input control signal CONT from an external device. For example, the input image data IMG may include red image data, green image data, and blue image data. In some embodiments, the input image data IMG may further include white image data. In another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, an fourth control signal CONT4, and a data signal DATA based on the input image data IMG and the input control signal CONT.

The driving controller 200 may generate the first control signal CONT1 for controlling an operation of the gate driver 300 based on the input control signal CONT, and may output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the fourth control signal CONT4 for controlling an operation of the emission driver 600 based on the input control signal CONT, and may output the fourth control signal CONT4 to the emission driver 600.

The gate driver 300 may generate gate signals transmitted to the pixel circuits PX through the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may output the gamma reference voltage VGREF to the data driver 500.

In an embodiment, the gamma reference voltage generator 400 may be disposed in the driving controller 200, or in the data driver 500.

The data driver 500 may receive the second control signal CONT2 and the data signal DATA from the driving controller 200, and may receive the gamma reference voltages VGREF from the gamma reference voltage generator 400. The data driver 500 may convert the data signal DATA having a digital type into data voltages having an analog type using the gamma reference voltages VGREF. The data driver 500 may output the data voltages to the data lines DL.

In an embodiment, the data driver 500 may be integrated on the peripheral region of the display panel 100.

The emission driver 600 may generate emission signals transmitted to the pixels PX through the emission lines EL in response to the fourth control signal CONT4 received from the driving controller 200. The emission driver 600 may output the emission signals to the emission lines EL.

In an embodiment, the emission driver 600 may be integrated on the peripheral region of the display panel 100.

Figure 2:
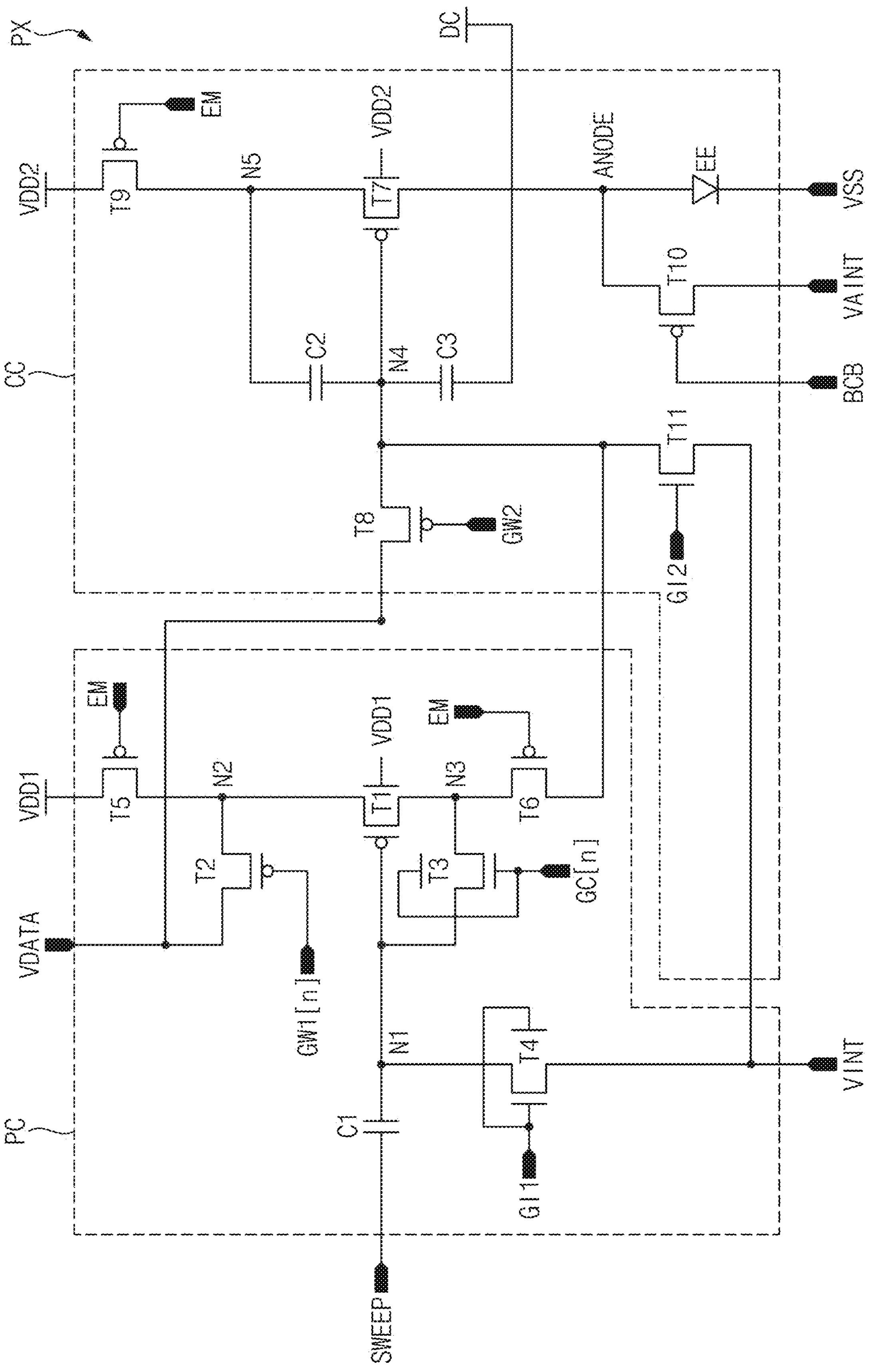
FIG. 2 is a circuit diagram illustrating an embodiment of a pixel circuit included in a display panel of the display device of FIG. 1.

FIG. 2 is a circuit diagram illustrating an embodiment of the pixel circuit PX included in the display panel 100 of the display device 1 of FIG. 1.

Referring to FIG. 2, the pixel circuit PX may include a first circuit PC and a second circuit CC.

The first circuit PC may be a pulse width modulation (PWM) block for performing a PWM operation. The second circuit CC may be a constant-current generation (CCG) circuit block for performing a CCG operation.

The first circuit PC may include first to sixth transistors T1 to T6 and a first capacitor C1. The second circuit CC may include seventh to eleventh transistors T7 to T11, a second capacitor C2, a third capacitor C3, and a light emitting element EE.

The first transistor T1 may include a control electrode connected to a first node N1, a first electrode connected to a second node, and a second electrode connected to a third node N3. The first transistor T1 may be referred to as a driving transistor of the first circuit PC.

In an embodiment, the first transistor T1 may further include a second control electrode which receives a first power supply voltage VDD1. In an example in which a charge of the first transistor T1 becomes unidirectionally biased, mura may occur on the display panel 100 by a charge imbalance of the first transistor T1. In an example in which the first transistor T1 further includes the second control electrode, the charge imbalance may be resolved, and then the mura of the display panel 100 may be prevented.

The second transistor T2 may include a control electrode which receives a first writing gate signal GW1[*n*], a first electrode connected to a data voltage terminal, and a second electrode connected to the second node N2.

The third transistor T3 may include a control electrode which receives a compensation gate signal GC[n], a first electrode connected to the first node N1, and a second electrode connected to the third node N3.

In an embodiment, the third transistor T3 may further include a second control electrode connected to the control electrode of the third transistor T3. Accordingly, a mobility of the third transistor T3 may be improved.

The fourth transistor T4 may include a control electrode which receives a first initialization gate signal G11, a first electrode connected to the first node N1, and a second electrode which receives a first initialization voltage VINT.

In an embodiment, the fourth transistor T4 may further include a second control electrode connected to the control electrode of the fourth transistor T4. Accordingly, a mobility of the fourth transistor T4 may be improved.

The fifth transistor T5 may include a control electrode which receives the emission signal EM, a first electrode which receives the first power supply voltage VDD1, and a second electrode connected to the second node N2.

The sixth transistor T6 may include a control electrode which receives the emission signal EM, a first electrode connected to the third node N3, and a second electrode connected to the fourth node N4.

The seventh transistor T7 may include a control electrode connected to the fourth node N4, a first electrode connected to a fifth node N5, and a second electrode connected to an anode ANODE of the light emitting element EE. The seventh transistor T7 may be referred to as a driving transistor of the second circuit CC.

In an embodiment, the seventh transistor T7 may further include a second control electrode which receives a second power supply voltage VDD2. In an example in which a charge of the seventh transistor T7 becomes unidirectionally biased, the mura may occur on the display panel 100 by a charge imbalance of the seventh transistor T7. In an example in which the seventh transistor T7 further includes the second control electrode, the charge imbalance may be resolved, and then the mura of the display panel 100 may be prevented.

The eighth transistor T8 may include a control electrode which receives a second writing gate signal GW2, a first electrode connected to the data voltage terminal, and a second electrode connected to the fourth node N4.

The ninth transistor T9 may include a control electrode which receives the emission signal EM, a first electrode which receives the second power supply voltage VDD2, and a second electrode connected to the fifth node N5.

The tenth transistor T10 may include a control electrode which receives a third initialization gate signal BCB, a first electrode connected to the anode ANODE of the light emitting element EE, and a second electrode which receives a second initialization voltage VAINT.

The eleventh transistor T11 may include a control electrode which receives a second initialization gate signal GI2, a first electrode connected to the fourth node N4, and a second electrode which receives the first initialization voltage VINT.

The first capacitor C1 may include a first electrode which receives a sweep signal SWEEP and a second electrode connected to the first node N1.

The second capacitor C2 may include a first electrode connected to the fifth node N5 and a second electrode connected to the fourth node N4.

The third capacitor C3 may include a first electrode connected to the fourth node N4 and a second electrode connected to a stabilization voltage terminal. A stabilization voltage DC may be applied to the stabilization voltage terminal. The stabilization voltage DC may be a constant voltage. For example, the stabilization voltage DC may be the first power supply voltage VDD1. For example, the stabilization voltage DC may be the second power supply voltage VDD2. For example, the stabilization voltage DC may be a third power supply voltage VSS. For example, the stabilization voltage DC may be the first initialization voltage VINT. For example, the stabilization voltage DC may be the second initialization voltage VAINT.

When the second electrode of the third capacitor C3 is connected to the anode ANODE of the light emitting element EE, a voltage of the fourth node N4 may be changed by a coupling of the third capacitor C3 when a voltage of the anode ANODE of the light emitting element EE is changed. Accordingly, stability of the pixel circuit PX may be decreased. In an example in which the second electrode of the third capacitor C3 is connected to the stabilization voltage terminal, the stabilization voltage DC, which is the constant voltage, may be applied to the second electrode of the third capacitor C3. Accordingly, the coupling by the third capacitor C3 may be prevented. Accordingly, the voltage of the fourth node N4 may be stabilized and the stability of the pixel circuit PX may be improved.

The light emitting element EE may include the anode ANODE connected to the second electrode of the seventh transistor T7 and a cathode which receives the third power supply voltage VSS. For example, the light emitting element EE may be a light emitting diode. For example, the light emitting element EE may be a micro light emitting diode.

Some of transistors of the pixel circuit PX may be implemented as P-channel metal oxide semiconductor (PMOS) transistors and others may be implemented as N-channel metal oxide semiconductor (NMOS) transistors. For example, the PMOS transistor may be a low temperature ploy silicon (LTPS) transistor. For example, the NMOS transistor may be an oxide transistor.

The third transistor T3, the fourth transistor T4, and the eleventh transistor T11 may be implemented as the NMOS transistors. A leakage current of each of the third transistor T3, the fourth transistor T4, and the eleventh transistor T11 may be decreased. Accordingly, the pixel circuit PX may stably operate even when a relatively lower power supply voltage is applied to the third transistor T3, the fourth transistor T4, and the eleventh transistor T11. Accordingly, power consumption of the display device 1 may be reduced.

The first transistor T1, the second transistor T2, and the fifth to tenth transistors T5 to T10 may be implemented as the PMOS transistors.

The data voltage VDATA, which is output at the data voltage terminal, may be an alternating current voltage. The data voltage VDATA, which is output at the data voltage terminal, may have one of first to third levels. For example, the data voltage VDATA having the first level may be a PWM data voltage (VPWM of FIG. 3) applied to the first electrode of the second transistor T2. The data voltage VDATA having the second level may be a constant-current voltage (VCCG of FIG. 3) applied to the first electrode of the eighth transistor T8. The data voltage VDATA having the third level may be a low voltage.

When the second transistor T2 is turned on, the data voltage VDATA may be transmitted to the first node N1. The data voltage VDATA may be the PWM data voltage (VPWM of FIG. 3). In an example in which the eighth transistor T8 is turned on, the data voltage VDATA may be transmitted to the fourth node N4. The data voltage VDATGA may be the constant-current voltage (VCCG of FIG. 3).

The PWM data voltage (VPWM of FIG. 3) and the constant-current voltage (VCCG of FIG. 3) are applied to the pixel circuit PX through the data voltage terminal, such that an additional voltage line for transmitting the constant-current voltage (VCCG of FIG. 3) to the fourth node N4 may be omitted. Accordingly, dead space of the display device 1 may be decreased.

In an embodiment, the PWM data voltage (VPWM of FIG. 3) may be different depending on a luminance intensity of the pixel circuit PX. In an embodiment, the constant-current voltage (VCCG of FIG. 3) may be the same for all pixel circuits PX. In an embodiment, the constant-current voltage (VCCG of FIG. 3) may be different depending on a color of the pixel circuit PX. For example, the constant-current voltage (VCCG of FIG. 3), which is applied to the pixel circuit PX emitting light of a red color, may have a first voltage level, the constant-current voltage (VCCG of FIG. 3), which is applied to the pixel circuit PX emitting light of a green color, may have a second voltage level which is different from the first voltage level, and the constant-current voltage (VCCG of FIG. 3), which is applied to the pixel circuit PX emitting light of a blue color, may have a third voltage level which is different from the first voltage level and the second voltage level.

For example, the first power supply voltage VDD1 and the second power supply voltage VDD2 may be high power supply voltages for determining a light emitting intensity of the light emitting element EE, and the third power supply voltage VSS may be a low power supply voltage for determining the light emitting intensity of the light emitting element EE. A voltage level of the first power supply voltage VDD1 and a voltage level of the second power supply voltage VDD2 may be higher than a level of the third power supply voltage VSS. The voltage level of the first power supply voltage VDD1 may be higher than the voltage level of the second power supply voltage VDD2.

In an emission period, the light emitting element EE may emit light while the first transistor T1 is turned off, the seventh transistor T7 is turned on. In a non-emission period, when the first transistor T1 is turned on and the first power supply voltage VDD1 is applied to the control electrode of the seventh transistor T7, the seventh transistor T7 may be turned off and the light emitting element may stop emitting light.

When the voltage level of the first power supply voltage VDD1 is higher than the voltage level of the second power supply voltage VDD2, the seventh transistor T7 may reliably maintain a turned-off state when the first power supply voltage VDD1 is applied to the control electrode of the seventh transistor T7.

For example, a voltage level of the second initialization voltage VATIN may be lower than the voltage level of the third power supply voltage VSS. In an example in which the voltage level of the second initialization voltage VATIN is lower than the voltage level of the third power supply voltage VSS, a leakage current may not flow to the light emitting element EE. Accordingly, a black characteristic of the pixel circuit PX may be improved.

In the first circuit PC, a threshold voltage of the first transistor T1 may be internally compensated by using a diode-connection structure of the third transistor T3.

In the second circuit CC, a threshold voltage of the seventh transistor T7 may be internally compensated by using a source follower structure including the second capacitor C2.

As the PWM operation is performed in the first circuit PX, a relatively low current may flow in the first circuit PC. In an example case in which the first circuit PC includes a source follower structure, the threshold voltage of the first transistor T1 may not be sufficiently compensated for and the mura may occur. Accordingly, the first circuit PC may include the diode-connection structure for internal compensation for the threshold voltage of the first transistor T1.

As a constant-current application operation is performed in the second circuit CC, a relatively high current may flow in the second circuit CC. In an example in which the second circuit CC includes the source follower structure, as a high current flow is applied to the second circuit CC, even if the threshold voltage of the seventh transistor T7 is not sufficiently compensated for, a display quality reduction issue may not occur. Accordingly, as the second circuit CC includes the source follower structure for internal compensation for the threshold voltage of the seventh transistor T7, the number of the transistors of the pixel circuit PX may be decreased.

In some aspects, as a capacitance of the second capacitor C2 increases, a capacitance of the third capacitor C3 decreases, compensation ability for the threshold voltage of the seventh transistor T7 may be improved.

The first writing gate signal GW1[*n*] may be a progressive scan signal having different timing for each pixel row, where n is an integer greater than or equal to 1. The pixel circuit PX, which receives the first writing gate signal GW1[*n*], may be the pixel circuit PX included in the n-th pixel row.

The first initialization gate signal GI1, the second initialization gate signal GI2, the third initialization gate signal BCB, and the second writing gate signal GW2 may be global signals having the same timing regardless of the pixel row. In some aspects, the emission signal EM may be the global signal having the same timing regardless of the pixel row. That is, the first initialization gate signal GI1, the second initialization gate signal GI2, the third initialization gate signal BCB, the second writing gate signal GW2, and the emission signal EM may be simultaneously applied to the pixel circuits PX included in the display panel 100.

In some aspects, the first power supply voltage VDD1, the second power supply voltage VDD2, the third power supply voltage VSS, the first initialization voltage VINT, and the second initialization voltage VAINT may be the constant voltage. In some aspects, the stabilization voltage DC may be the constant voltage.

Figure 3:
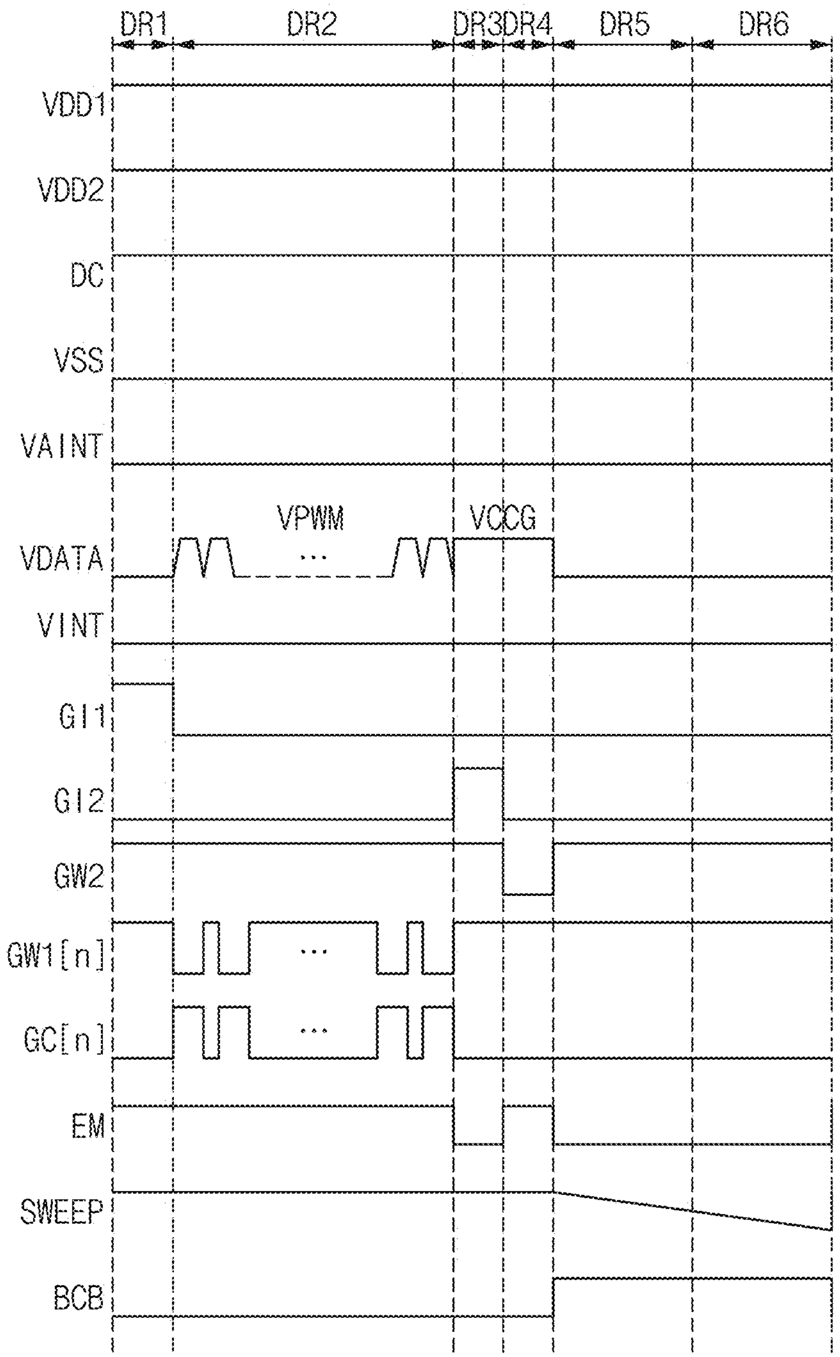
FIG. 3 is a timing diagram illustrating an operation of the pixel circuit of FIG. 2.
Figure 4:
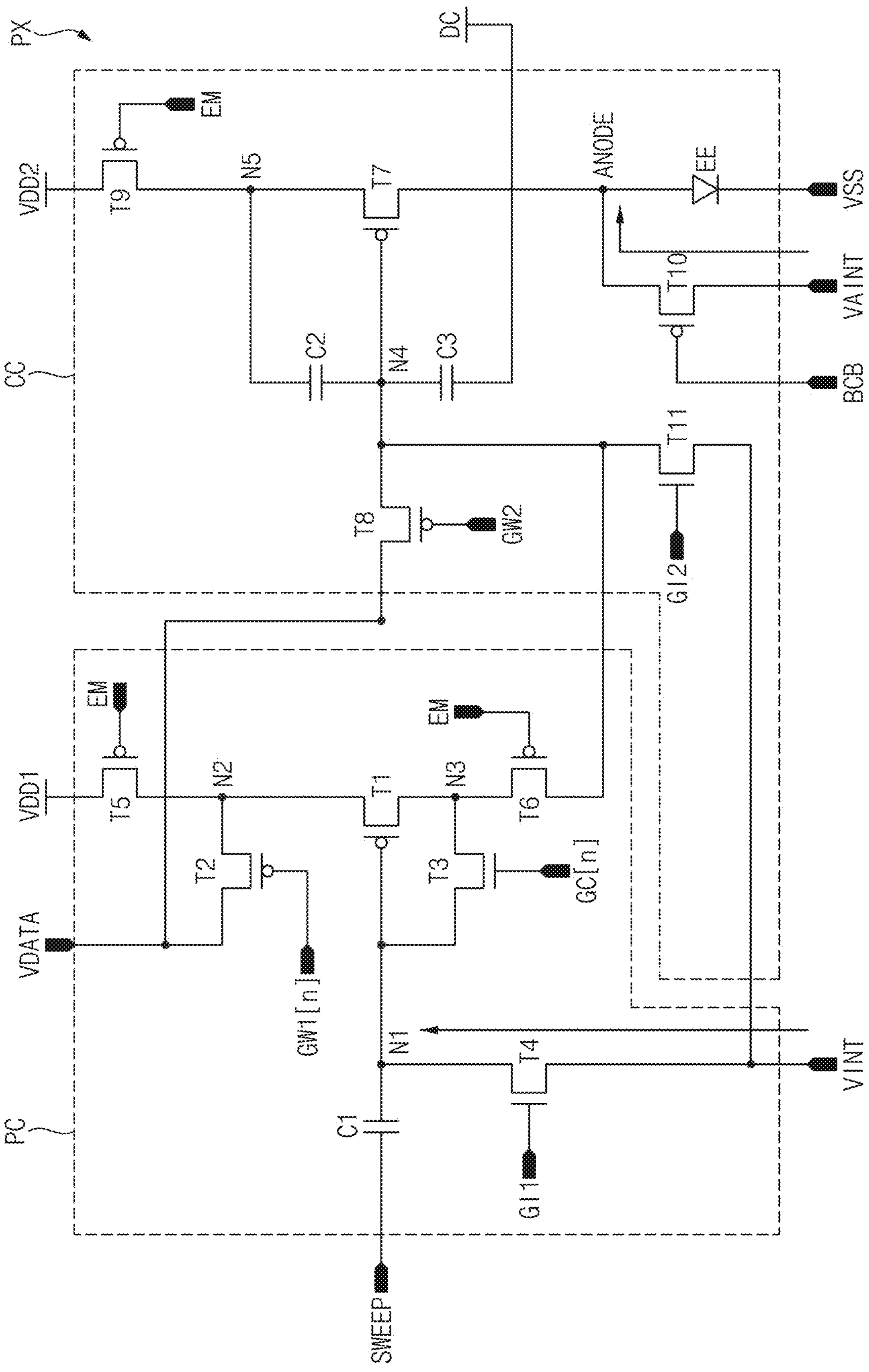
FIG. 4 is a circuit diagram illustrating an operation of the pixel circuit of FIG. 2 in a first period of the timing diagram of FIG. 3.
Figure 5:
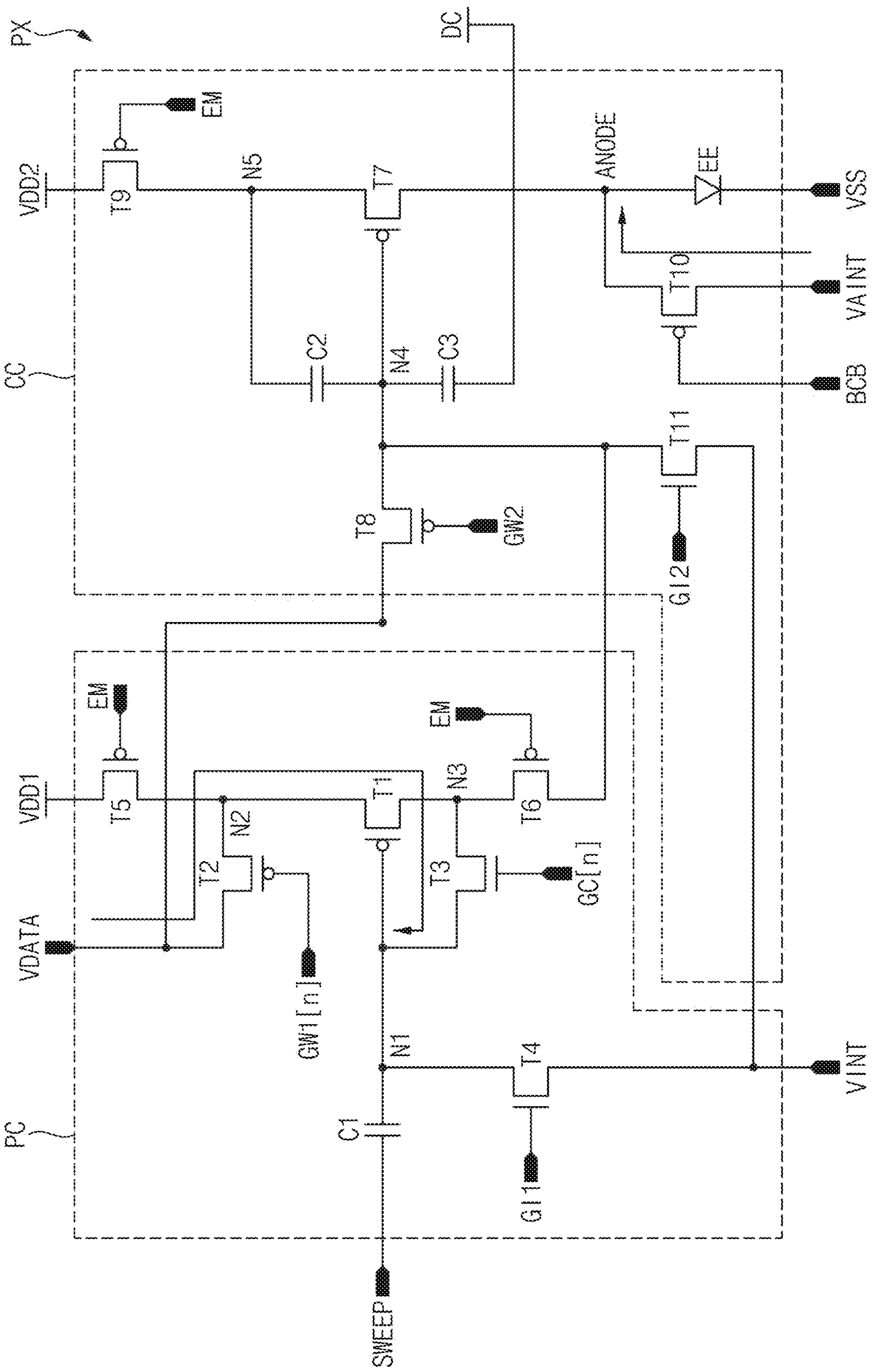
FIG. 5 is a circuit diagram illustrating an operation of the pixel circuit of FIG. 2 in a second period of the timing diagram of FIG. 3.
Figure 6:
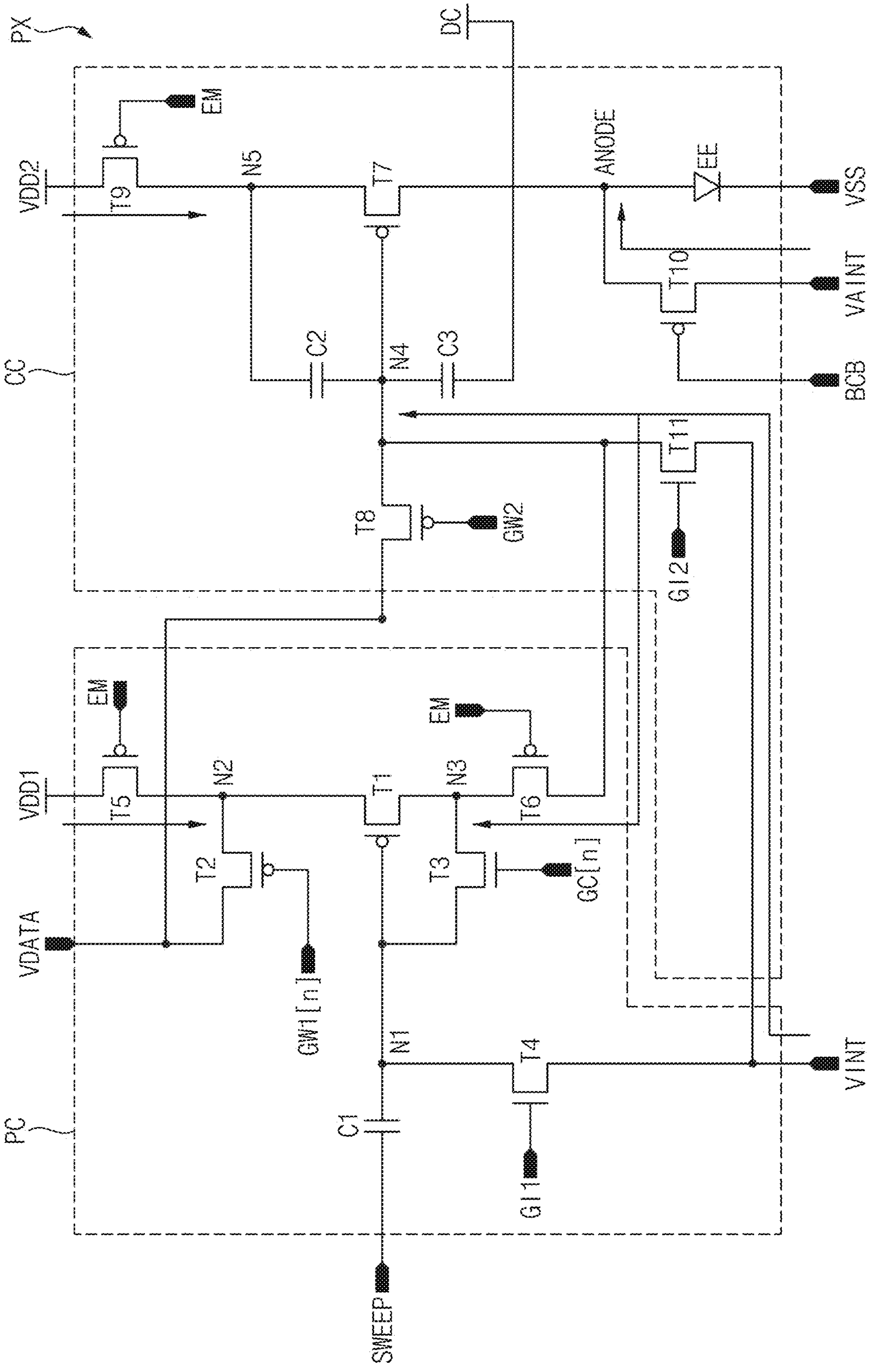
FIG. 6 is a circuit diagram illustrating an operation of the pixel circuit of FIG. 2 in a third period of the timing diagram of FIG. 3.
Figure 7:
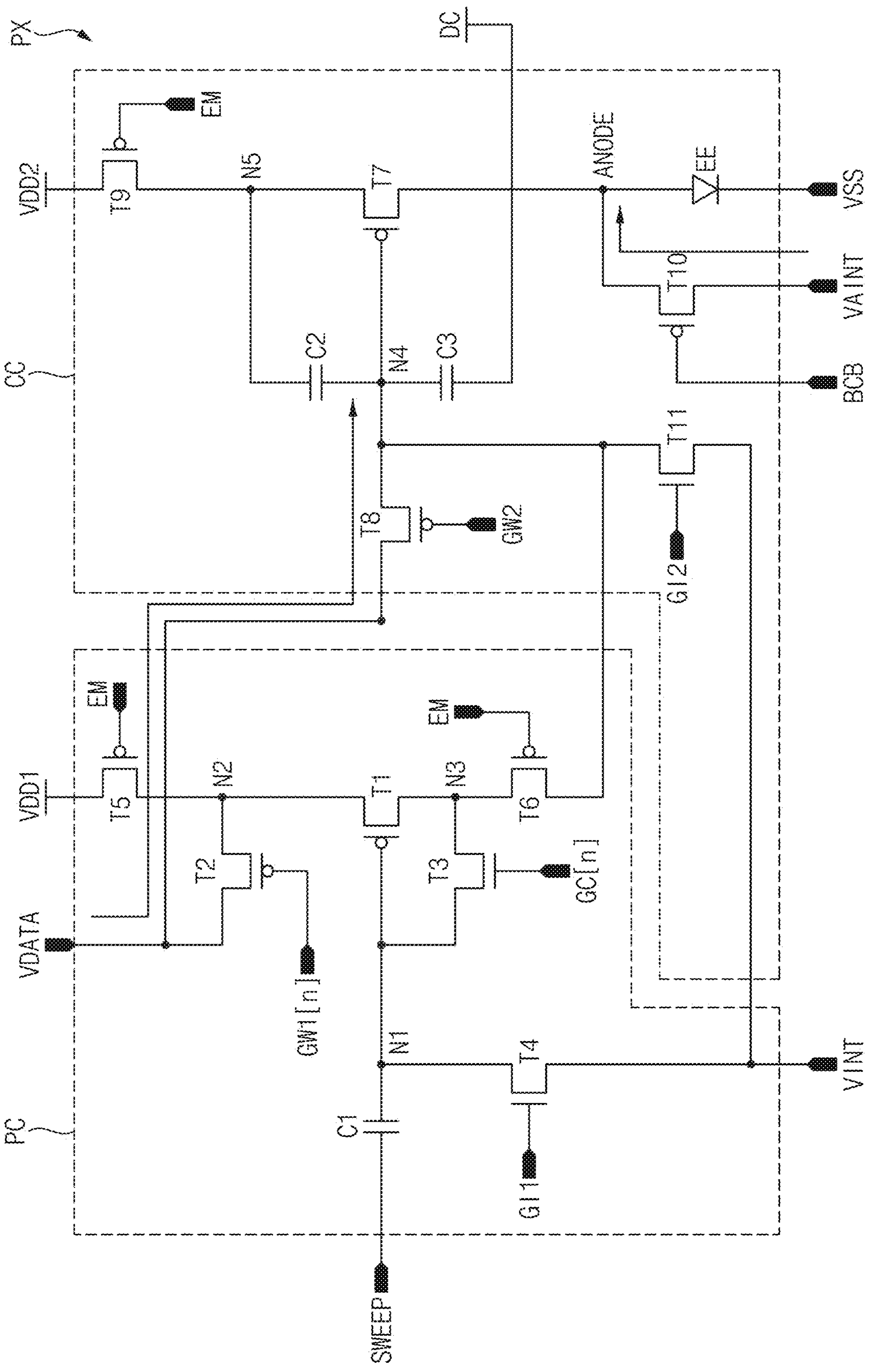
FIG. 7 is a circuit diagram illustrating an operation of the pixel circuit of FIG. 2 in a fourth period of the timing diagram of FIG. 3.
Figure 8:
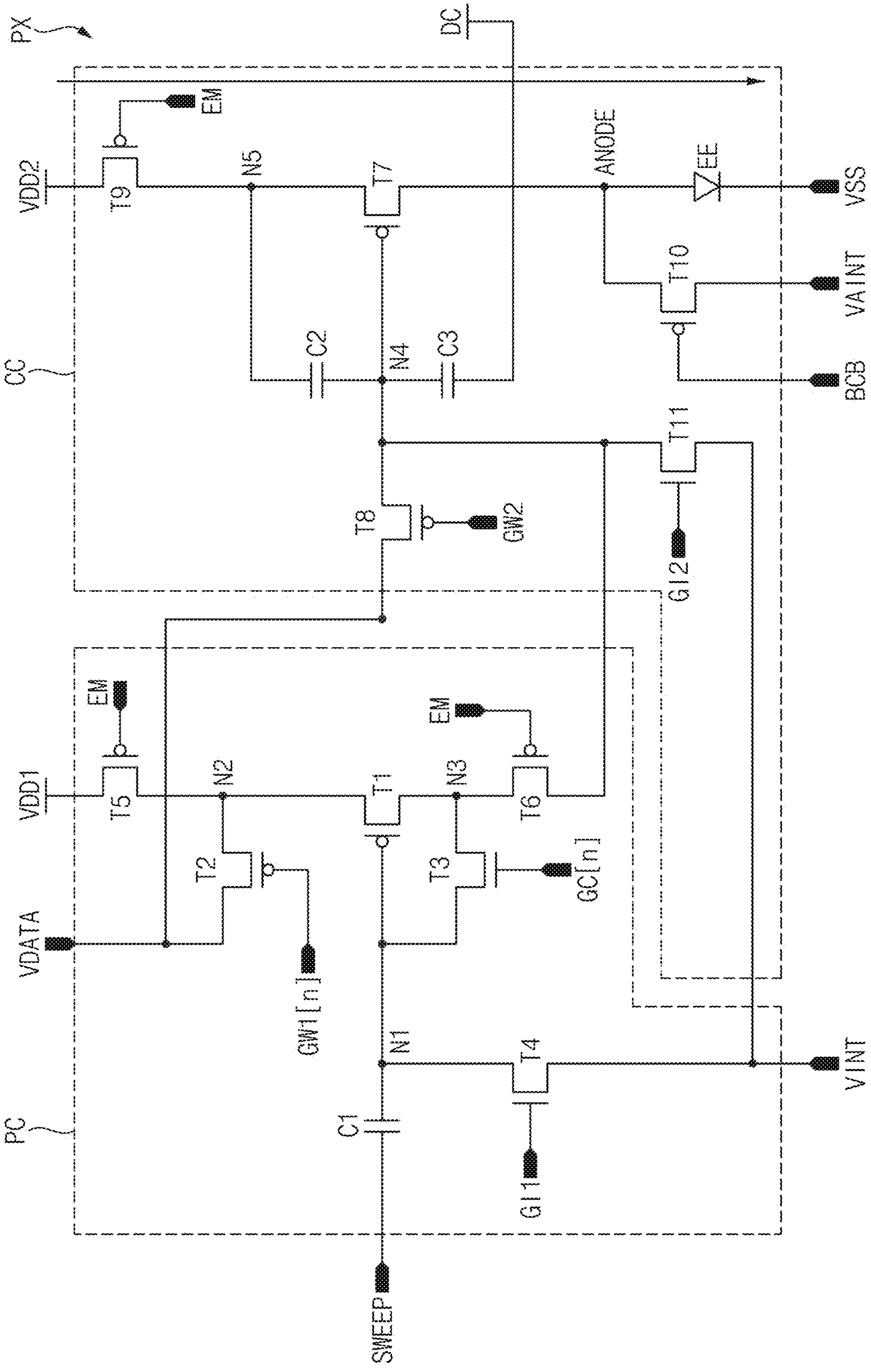
FIG. 8 is a circuit diagram illustrating an operation of the pixel circuit of FIG. 2 in a fifth period of the timing diagram of FIG. 3.
Figure 9:
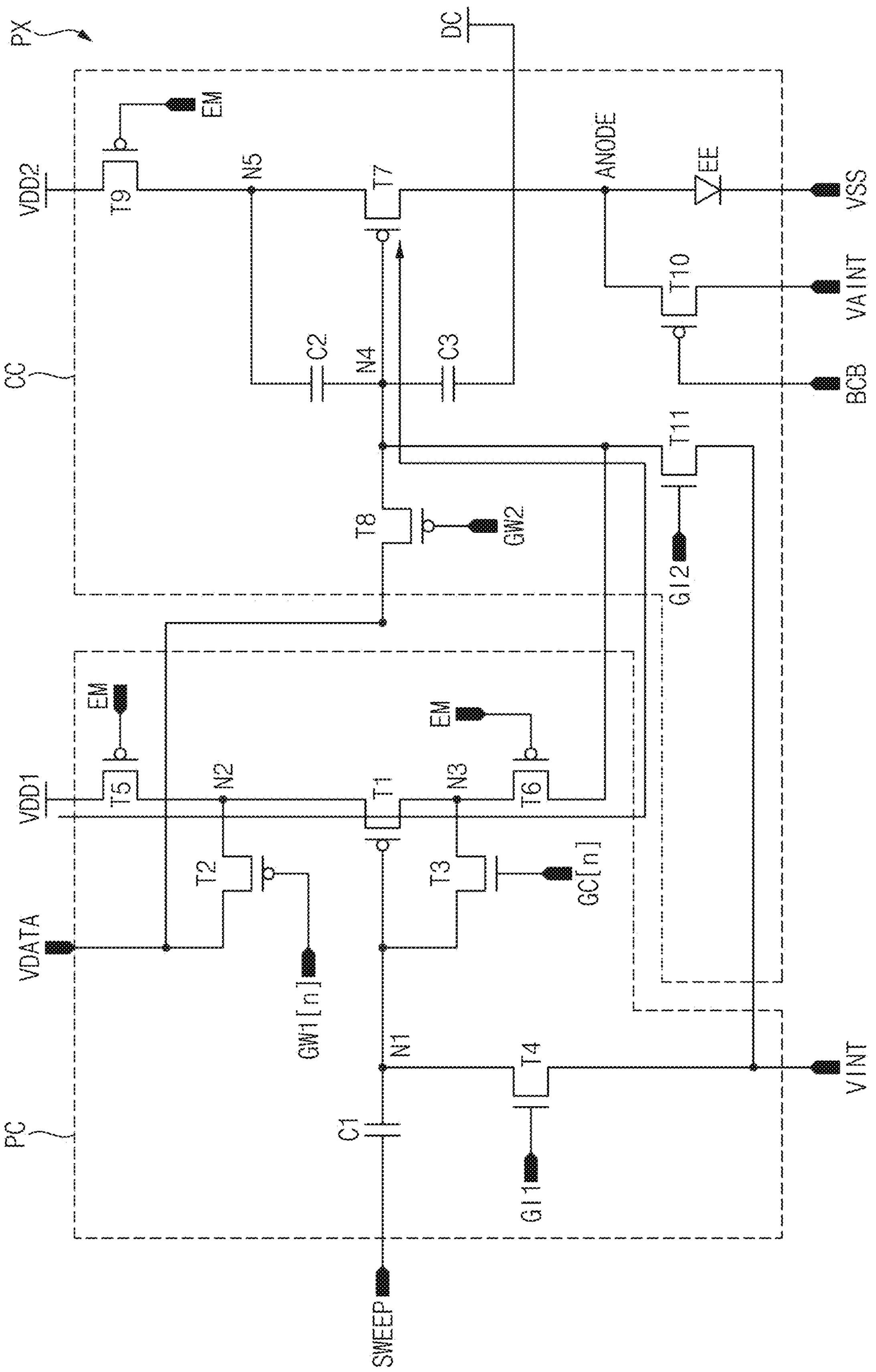
FIG. 9 is a circuit diagram illustrating an operation of the pixel circuit of FIG. 2 in a sixth period of the timing diagram of FIG. 3.

FIG. 3 is a timing diagram illustrating an operation of the pixel circuit PX of FIG. 2. FIG. 4 is a circuit diagram illustrating an operation of the pixel circuit PX of FIG. 2 in a first period DR1 of the timing diagram of FIG. 3. FIG. 5 is a circuit diagram illustrating an operation of the pixel circuit PX of FIG. 2 in a second period DR2 of the timing diagram of FIG. 3. FIG. 6 is a circuit diagram illustrating an operation of the pixel circuit PX of FIG. 2 in a third period DR3 of the timing diagram of FIG. 3. FIG. 7 is a circuit diagram illustrating an operation of the pixel circuit PX of FIG. 2 in a fourth period DR4 of the timing diagram of FIG. 3. FIG. 8 is a circuit diagram illustrating an operation of the pixel circuit PX of FIG. 2 in a fifth period DR5 of the timing diagram of FIG. 3. FIG. 9 is a circuit diagram illustrating an operation of the pixel circuit PX of FIG. 2 in a sixth period DR6 of the timing diagram of FIG. 3.

Referring to FIG. 3, periods in which signals are applied to the pixel circuit PX may include the first period DR1, the second period DR2, the third period DR3, the fourth period DR4, the fifth period DR5, and the sixth period DR6.

The first period DR1 may be a first initialization period, the second period DR2 may be a PWM data voltage VPWM writing and first compensation period, the third period DR3 may be a second initialization period, the fourth period DR4 may be a constant-current voltage VCCG writing and second compensation period, the fifth period DR5 may be the emission period, and the sixth period DR6 may be the non-emission period.

A width of the fifth period DR5 may be determined by a level of the PWM data voltage VPWM.

The sweep signal SWEEP may have a high level in the first to fourth periods DR1 to DR4 and may gradually decrease from the high level in the fifth period DR5 and the sixth period DR6.

Although waveforms of the first writing gate signal GW1 [*n*] and waveforms of the PWM data voltage VPWM are plural within the second period DR2 in FIGS. 3, 11, 14, 16, and 18 for convenience of explanation, this does not mean that the first writing gate signal GW1[*n*] and the PWM data voltage VPWM are applied multiple times, but means that the first writing gate signal GW1[*n*] is sequentially applied to the pixel circuit PX for each pixel row and the PWM data voltage VPWM is written in each pixel row.

Referring to FIG. 4, in the first period DR1, the first initialization gate signal GI1 and the third initialization gate signal BCB may have activation levels. For example, the first initialization gate signal GI1 may have a high level and the third initialization gate signal BCB may have a low level. In some aspects, the second initialization gate signal GI2, the first writing gate signal GW1[*n*], the second writing gate signal GW2, the compensation gate signal GC[n], and the emission signal EM may have deactivation levels. For example, the second initialization gate signal GI2 may have a low level, the first writing gate signal GW1 [n], the second writing gate signal GW2, and the emission signal EM may have a high level, and the compensation gate signal GC[n] may have a low level. In some aspects, the sweep signal SWEEP may have the high level. In some aspects, the data voltage VDATA, which is applied to the data voltage terminal, may have the third level. That is, the data voltage VDATA may have the low voltage and the low voltage may be applied to the data voltage terminal.

The fourth transistor T4 and the tenth transistor T10 may be turned on. Accordingly, the fourth transistor T4 may transmit the first initialization voltage VINT to the first node N1 and the tenth transistor T10 may transmit the second initialization voltage VAINT to the anode ANODE of the light emitting element EE.

A voltage of the first node N1 may be initialized to the first initialization voltage VINT. The first initialization voltage VINT may have a level for turning on the first transistor T1. The voltage of the anode ANODE of light emitting element EE may be initialized to the second initialization voltage VAINT.

Referring to FIG. 5, in the second period DR2, the first writing gate signal GW1[*n*] and the compensation gate signal GC[n] may have activation pulses. In some aspects, the third initialization gate signal BCB may have the activation level. For example, the third initialization gate signal BCB may have the low level. In some aspects, the first initialization gate signal GI1 may have a deactivation level and the second initialization gate signal G12, the second writing gate signal GW2, and the emission signal EM may have the deactivation levels. For example, the first initialization gate signal GI1 may have a low level, the second initialization gate signal GI2 may have the low level, and the second writing gate signal GW2 and the emission signal EM may have the high levels. In some aspects, the sweep signal SWEEP may maintain the high level. In some aspects, the data voltage VDATA, which is applied to the data voltage terminal, may have the first level. That is, the data voltage VDATA may be the PWM data voltage VPWM and the PWM data voltage VPWM may be applied to the data voltage terminal.

The tenth transistor T10 may be turned on. In some aspects, the second transistor T2 may be turned on by the first writing gate signal GW1 [n]. The first transistor T1 may be turned on by the voltage of the first node N1. The third transistor T3 may be turned on by the compensation gate signal GC[n]. Accordingly, the PWM data voltage VPWM may be transmitted to the first node N1 through the first to third transistors T1 to T3. The threshold voltage of the first transistor T1 may be compensated for by the third transistor T3 which is diode-connected.

A voltage of the control electrode of the first transistor T1 may be "VPWM-Vth1", where VPWM denotes the PWM data voltage VPWM, Vth1 denotes the threshold voltage of the first transistor T1. In an example in which a voltage, which has a magnitude "VPWM-Vth1", is stored in the first node N1 in the second period DR2, the first transistor T1 may be turned off.

Referring to FIG. 6, in the third period DR3, the second initialization gate signal GI2 and the emission signal EM may have activation levels and the third initialization gate signal BCB may have the activation level. For example, the second initialization gate signal GI2 may have a high level, the emission signal EM may have a low level, and the third gate signal BCB may have the low level. In some aspects, the first initialization gate signal GI1, the first writing gate signal GW1[*n*], the second writing gate signal GW2, and the compensation gate signal GC[n] may have the deactivation levels. For example, the first initialization gate signal GI1 and the compensation gate signal GC[n] may have the low levels and the first writing gate signal GW1[*n*] and the second writing gate signal GW2 may have the high levels. In some aspects, the sweep signal SWEEP may maintain the high level. In some aspects, the data voltage VDATA, which is applied to the data voltage terminal, may have the second level. That is, the data voltage VDATA may be the constant-current voltage VCCG and the constant-current voltage VCCG may be applied to the data voltage terminal.

The tenth transistor T10 may be turned on. In some aspects, the fifth transistor T5, the sixth transistor T6, the ninth transistor T9, and the eleventh transistor T11 may be turned on. Accordingly, the fifth transistor T5 may transmit the first power supply voltage VDD1 to the second node N2. The first initialization voltage VINT may be transmitted to the third node N3 through the sixth transistor T6 and the eleventh transistor T11. The first initialization voltage VINT may be transmitted to the fourth node N4 through the eleventh transistor T11. The second power supply voltage VDD2 may be transmitted to the fifth node N5 through the ninth transistor T9.

A voltage of the fifth node N5 may be initialized to the first initialization voltage VINT.

Referring to FIG. 7, in the fourth period DR4, the writing gate signal GW2 may have an activation level and the third initialization gate signal BCB may have the activation level. For example, the writing gate signal GW2 may have a low level and the third initialization gate signal BCB may have the low level. In some aspects, the first initialization gate signal GI1, the second initialization gate signal GI2, the first writing gate signal GW1[*n*], the compensation gate signal GC[n], and the emission signal EM may have the deactivation levels. For example, the first initialization gate signal GI1, the second initialization gate signal GI2, and the compensation gate signal GC[n] may have the low levels and the first writing gate signal GW1[*n*] and the emission signal EM may have the high levels. In some aspects, the sweep signal SWEEP may maintain the high level. In some aspects, the data voltage VDATA, which is applied to the data voltage terminal, may have the second level. That is, the data voltage VDATA may be the constant-current voltage VCCG and the constant-current voltage VCCG may be applied to the data voltage terminal.

The tenth transistor T10 may be turned on. In some aspects, the eighth transistor T8 may be turned on. Accordingly, the eighth transistor T8 may transmit the constant-current voltage VCCG to the fourth node N4. Accordingly, the constant-current voltage VCCG may be applied to the fourth node N4.

The third capacitor C3 may store the constant-current voltage VCCG.

In the fourth period DR4, the voltage of the fourth node N4 may be "VCCG" and the voltage of the fifth node N5 may be "VCCG+Vth7", where VCCG denotes the constant-current voltage VCCG and the Vth7 denotes the threshold voltage of the seventh transistor T7.

Referring to FIG. 8, in the fifth period DR5, the emission signal EM may have the activation level. For example, the emission signal EM may have the low level. In some aspects, the first initialization gate signal GI1, the second initialization gate signal GI2, the first writing gate signal GW1[*n*], the second writing gate signal GW2, and the compensation gate signal GC[n] may have the deactivation levels and the third initialization gate signal BCB may have a deactivation level. For example, the first initialization gate signal GI1, the second initialization gate signal GI2, and the compensation gate signal GC[n] may have the low levels, the first writing gate signal GW1[*n*], the second writing gate signal GW2 may have the high levels, and the third initialization gate signal BCB may have a high level. In some aspects, the sweep signal SWEEP may gradually decrease from the high level to the low level. The data voltage VDATA, which is applied to the data voltage terminal, may have the third level. That is, the data voltage VDATA may be the low voltage and the low voltage may be applied to the data voltage terminal.

The fifth transistor T5, the sixth transistor T6, the ninth transistor T9 may be turned on. In some aspects, the seventh transistor T7 may be turned on by the constant-current voltage VCCG of the fourth node N4.

As a current flows through the ninth transistor T9, the seventh transistor T7, and the light emitting element EE, the light emitting element EE may emit light.

The voltage of the fourth node N4 may be calculated by [Equation 1], "VCCG+(VCCG+Vth7)*(C2/(C2+C3))", where, the VCCG denotes the constant-current voltage VCCG, Vth7 denotes the threshold voltage of the seventh transistor T7, C2 denotes the capacitance of the second capacitor C2, and C3 denotes the capacitance of the third capacitor C3.

Referring to FIG. 9, in the sixth period DR6, the emission signal EM may have the activation level. For example, the emission signal EM may have the low level. In some aspects, the first initialization gate signal GI1, the second initialization gate signal G12, the third initialization gate signal BCB, the first writing gate signal GW1[*n*], the second writing gate signal GW2, and the compensation gate signal GC[n] may have the deactivation levels. For example, the first initialization gate signal GI1, the second initialization gate signal GI2, and the compensation gate signal GC[n] may have the low levels and the first writing gate signal GW1[*n*], the second writing gate signal GW2, and the third initialization gate signal BCB may have the high levels. In some aspects, the sweep signal SWEEP may continue to gradually decrease following the fifth period DR5. In some aspects, the data voltage VDATA, which is applied to the data voltage terminal, may have the third level. That is, the data voltage may be the low voltage and the low voltage may be applied to the data voltage terminal.

When the sweep signal SWEEP gradually decreases, the voltage of the first node N1 may gradually decrease by a coupling of the first capacitor C1. The voltage of the first node N1 may decrease from "VPWM-Vth1" by the sweep signal SWEEP which gradually decreases, where, VPWM denotes the PWM data voltage VPWM and the Vth1 denotes the threshold voltage of the first transistor T1. In an example in which the voltage of the first node N1 has a certain level, the first transistor T1 may be turned on.

When the first transistor T1 is turned on, the first power supply voltage VDD1 may be applied to the control electrode of the seventh transistor T7 through the fifth transistor T5, the first transistor T1, and the sixth transistor T6.

When the first power supply voltage VDD1 is applied to the control electrode of the seventh transistor T7, the seventh transistor T7 may be turned off and the light emitting element EE may stop emitting light.

A time at which the first transistor T1 is turned on may be determined by the level of the PWM data voltage VPWM applied to the control electrode of the first transistor T1. That is, a length of the emission period of the light emitting element EE may be determined by the PWM data voltage VPWM.

The pixel circuit PX may include 11 transistors and 3 capacitors. The pixel circuit PX may be driven by PWM method and may perform the internal compensation for the threshold voltage of the first transistor T1 and the threshold voltage of the seventh transistor T7. As the pixel circuit PX has relatively small number of transistors compared to a conventional pixel circuit, an integration density of the pixel circuits PX included in the display panel 100 may be increased. In an example in which the integration density of the pixel circuits PX is increased, resolution of the display device 1 may be increased. Accordingly, the pixel circuit PX may be applicable to an ultra-high resolution display device.

In some aspects, as at least one transistor of the first circuit PC and at least one transistor of the second circuit CC are implemented as the NMOS transistors, the power consumption of the display device 1 may be reduced.

In some aspects, as the second circuit CC includes the second capacitor C2 for performing the internal compensation for the threshold voltage of the seventh transistor T7, the number of the transistors may be decreased.

In some aspects, the first transistor T1 of the first circuit PC and the seventh transistor T7 of the second circuit CC may be implemented as the PMOS transistors. The mobility of the first transistor T1 and the mobility of the seventh transistor T7 may be improved.

In some aspects, as the voltage level of the second initialization voltage VAINT for initializing the anode ANODE of the light emitting element EE is lower than the voltage level of the third power supply voltage VSS, the leakage current which flows to the light emitting element EE may be prevented. Accordingly, the black characteristic of the pixel circuit PX may be improved.

In some aspects, as the PWM data voltage VPWM applied to the first electrode of the first transistor T1 and the constant-current voltage VCCG applied to the control electrode of the seventh transistor T7 are applied to the first circuit PC or the second circuit CC through the data voltage terminal, the number of the transistors and the number of signal lines may be decreased. Accordingly, the dead space of the display device 1 may be decreased.

Figure 10:
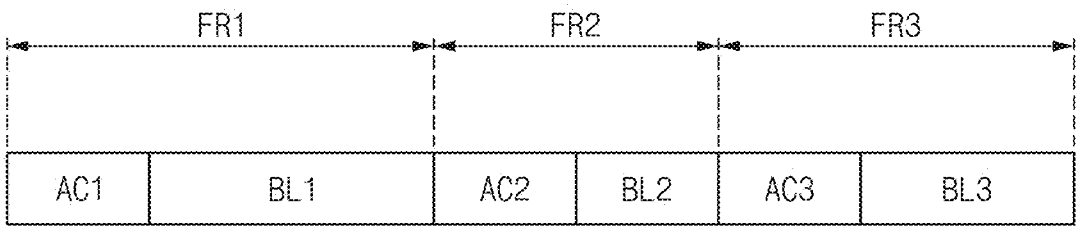
FIG. 10 is a conceptual diagram illustrating a driving frequency of the display panel included in the display device of FIG. 1.
Figure 11:
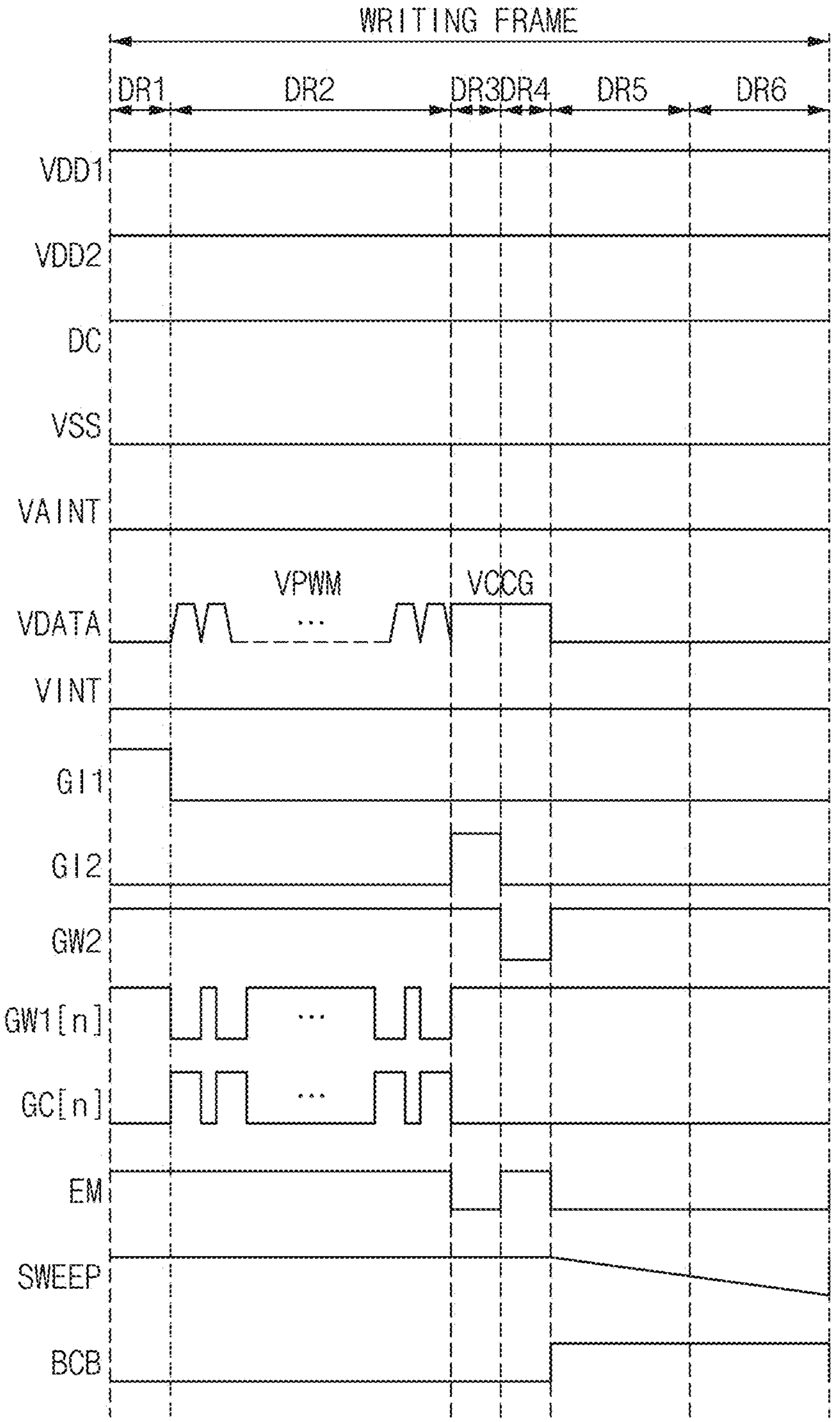
FIG. 11 is a timing diagram illustrating an operation of the pixel circuit of FIG. 2 in a writing frame.
Figure 12:
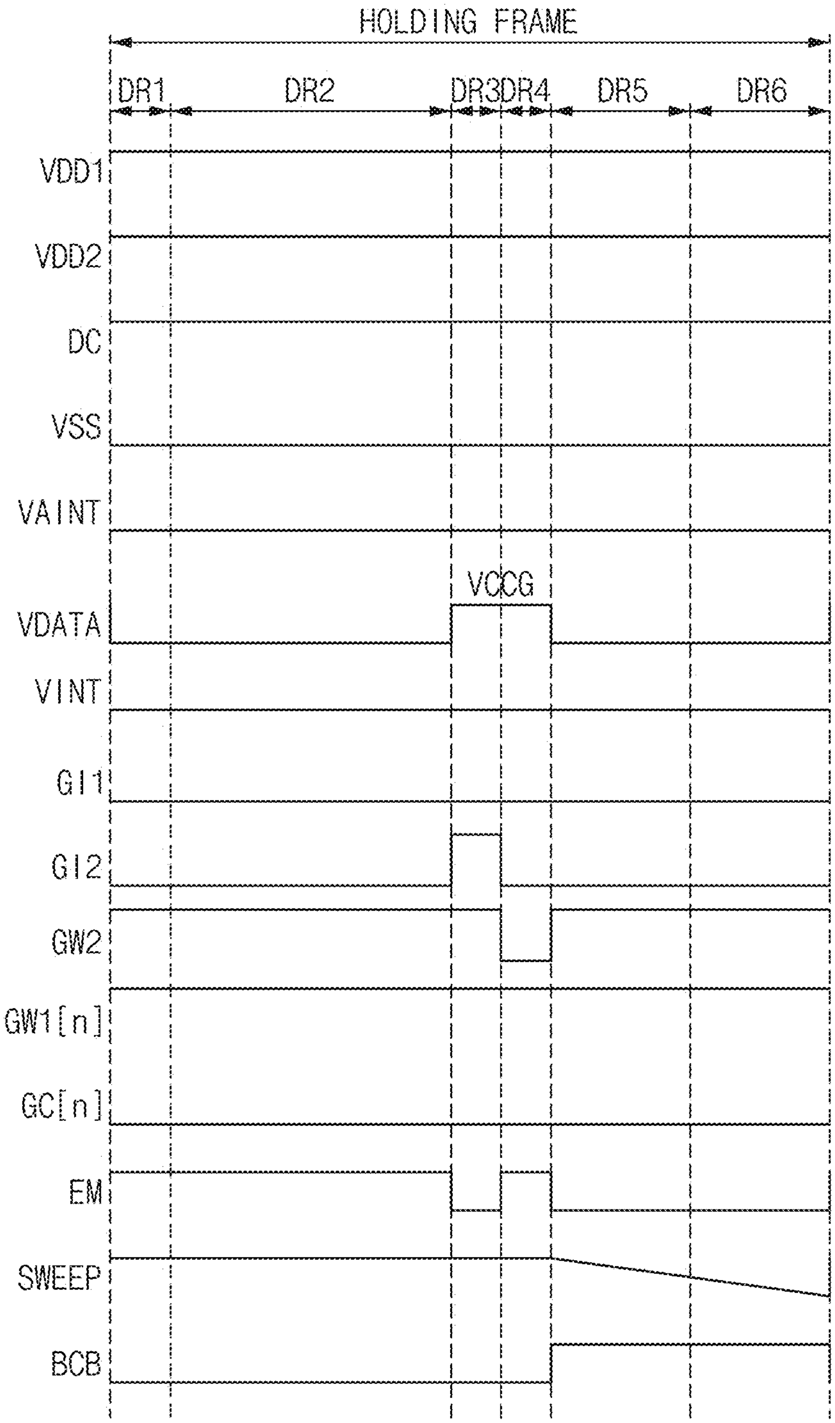
FIG. 12 is a timing diagram illustrating an operation of the pixel circuit of FIG. 2 in a holding frame.

FIG. 10 is a conceptual diagram illustrating a driving frequency of the display panel 100 included in the display device 1 of FIG. 1. FIG. 11 is a timing diagram illustrating an operation of the pixel circuit PX of FIG. 2 in a writing frame WRITING FRAME. FIG. 12 is a timing diagram illustrating an operation of the pixel circuit PX of FIG. 2 in a holding frame HOLDING FRAME.

Referring to FIGS. 10 to 12, the display panel 100 may be driven according to a variable frequency.

A first frame FR1 having a first frequency may include a first active period AC1 and a first blank period BL1. A second frame FR2 having a second frequency different from the first frequency may include a second active period AC2 and a second blank period BL2. A third frame FR3 having a third frequency different from the first frequency and the second frequency may include a third active period AC3 and a third blank period BL3.

The length of the first active period AC1 may be the same as a length of the second active period AC2. The length of the first blank period BL1 may be different from a length of the second blank period BL2.

The length of the second active period AC2 may be the same as a length of the third active period AC3. The length of the second blank period BL2 may be different from a length of the third blank period BL3.

The display device 1 supporting the variable frequency may include the writing frame WRITING FRAME in which the PWM data voltage VPWM is written to the pixel circuit PX and the holding frame HOLDING FRAME in which light emission is performed without writing the PWM data voltage VPWM to the pixel circuit PX. The writing frame WRITING FRAME may be in the active period AC1, AC2 and AC3. The holding frame HOLDING FRAME may be in the blank period BL1, BL2 and BL3.

For example, in the writing frame WRITING FRAME, the PWM data voltage VPWM may be applied to the first transistor T1 and the light emitting element EE may emit light. For example, in the holding frame HOLDING FRAME, the PWM data voltage VPWM may not be applied to the first transistor T1 and the light emitting element EE may emit light.

In the writing frame WRITING FRAME of FIG. 11, the first period DR1 may be the first initialization period, the second period DR2 may be the PWM data voltage VPWM writing and first compensation period, the third period DR3 may be the second initialization period, the fourth period DR4 may be the constant-current voltage VCCG writing and second compensation period, the fifth period DR5 may be the emission period, and the sixth period DR6 may be the non-emission period. The timing diagram of FIG. 11 is substantially the same as the timing diagram of FIG. 3. Thus, the same reference numerals will be used to refer to the same or like parts as those described in the previous embodiment of FIG. 3 and any repetitive explanation concerning the above elements will be omitted.

In the holding frame HOLDING FRAME of FIG. 12, the first period DR1 may be the first initialization period, the second period DR2 may be the PWM data voltage VPWM writing and first compensation period, the third period DR3 may be the second initialization period, the fourth period DR4 may be the constant-current voltage VCCG writing and second compensation period, the fifth period DR5 may be the emission period, and the sixth period DR6 may be the non-emission period.

The timing diagram of FIG. 12 is substantially the same as the timing diagram of FIG. 3 except for the first writing gate signal GW1[*n*], the first initialization gate signal GI1, and the compensation gate signal GC[n]. Thus, the same reference numerals will be used to refer to the same or like parts as those described in the previous embodiment of FIG. 3 and any repetitive explanation concerning the above elements will be omitted.

In the first period DR1, the second period DR2, the fifth period DR5, and the sixth period DR6 of the holding frame HOLDING FRAME, the data voltage VDATA may have the third level. That is, in the first period DR1, the second period DR2, the fifth period DR5, and the sixth period DR6 of the holding frame HOLDING FRAME, the data voltage may be the low voltage.

In the third period DR3 and the fourth period DR4 of the holding frame HOLDING FRAME, the data voltage may have the second level. That is, in the third period DR3 and the fourth period DR4 of the holding frame HOLDING FRAME, the data voltage VDATA may be the constant-current voltage VCCG.

In the first to sixth periods DR1 to DR6 of the holding frame HOLDING FRAME, the first writing gate signal GW1[*n*], the first initialization gate signal GI1, and the compensation gate signal GC[n] may maintain the deactivation level. For example, in the first to sixth periods DR1 to DR6 of the holding frame HOLDING FRAME, the first initialization gate signal GI1 and the compensation gate signal GC[n] may maintain the low levels and the first writing gate signal GW1[*n*] may maintain the high level.

Accordingly, in the holding frame HOLDING FRAME, the PWM data voltage VPWM may not be written to the pixel circuit PX, and the light emitting element EE may emit light based on the constant-current voltage VCCG.

Figure 13:
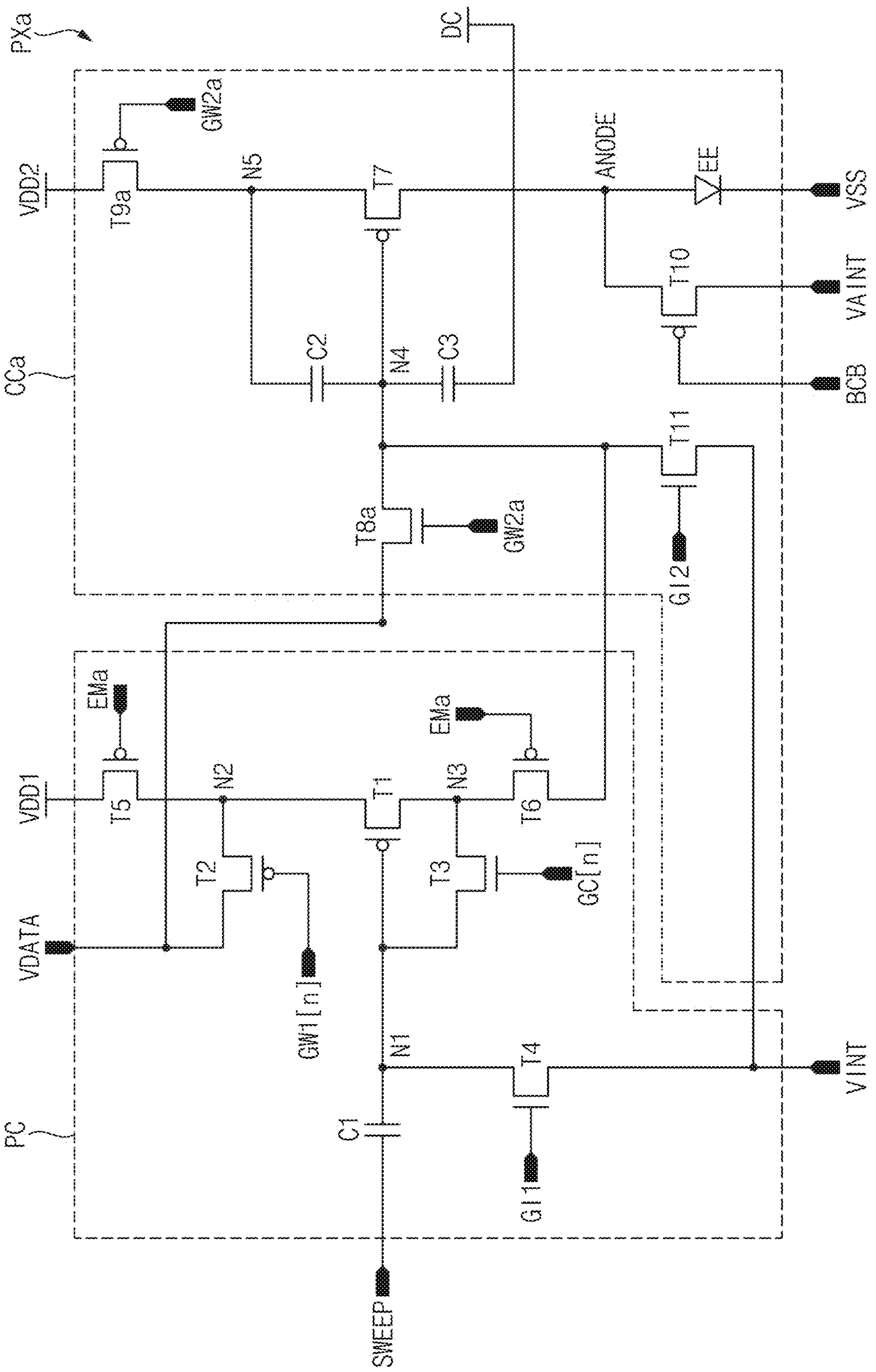
FIG. 13 is a circuit diagram illustrating an embodiment of a pixel circuit included in the display panel of the display device of FIG. 1.
Figure 14:
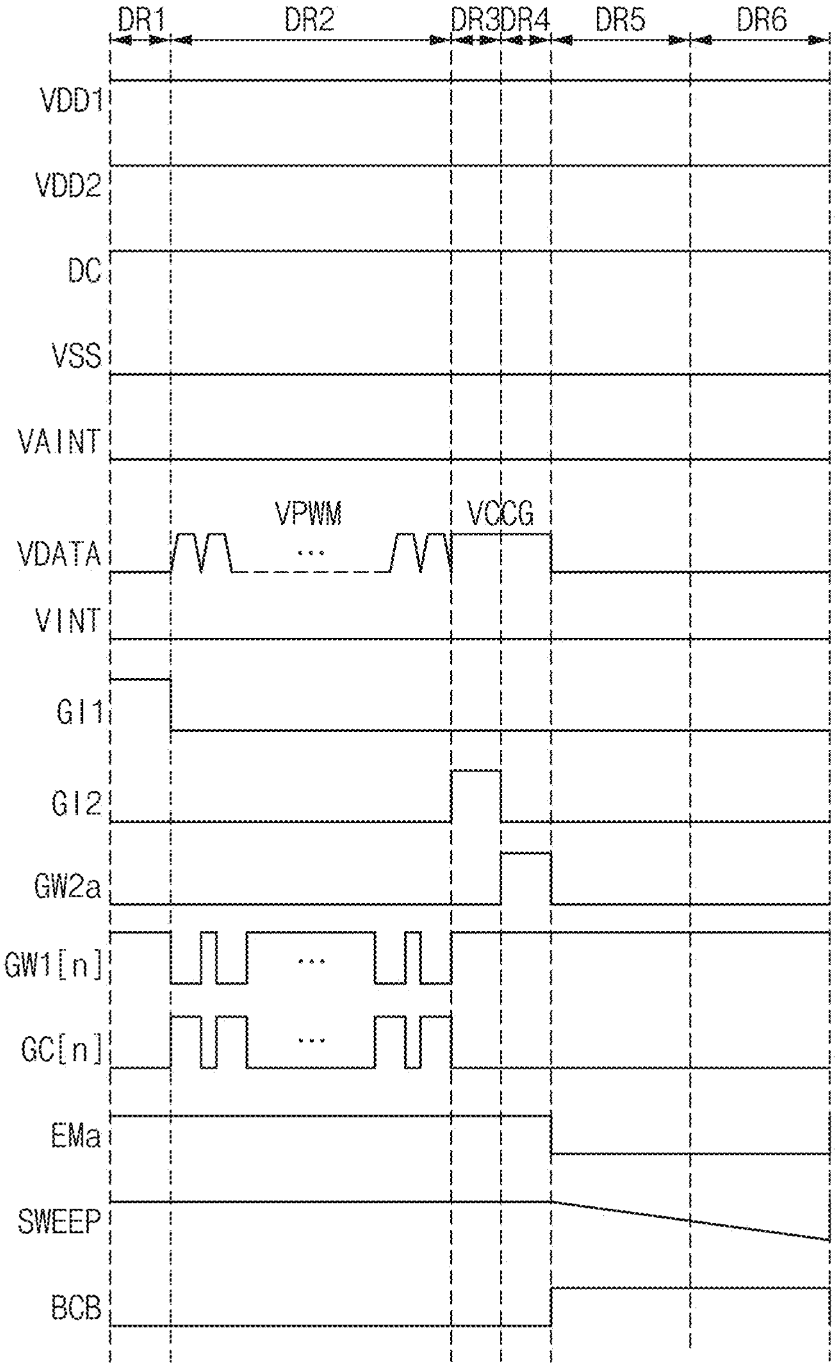
FIG. 14 is a timing diagram illustrating an operation of the pixel circuit of FIG. 13.

FIG. 13 is a circuit diagram illustrating an embodiment of a pixel circuit PXa included in the display panel 100 of the display device 1 of FIG. 1. FIG. 14 is a timing diagram illustrating an operation of the pixel circuit PXa of FIG. 13.

Referring to FIGS. 13 and 14, the pixel circuit PXa may include the first circuit PC and a second circuit CCa.

The first circuit PC may include the first to sixth transistors T1 to T6 and the first capacitor C1. The second circuit CCa may include seventh to eleventh transistors T7 to T11, the second capacitor C2, and the third capacitor C3. The second circuit CCa may include the light emitting element EE.

The pixel circuit PXa of FIG. 13 and the timing diagram of FIG. 14 are substantially the same as the pixel circuit PX of FIG. 2 and the timing diagram of FIG. 3 except for a second writing gate signal GW2*a*, an emission signal EMa, the eighth transistor T8*a*, and the ninth transistor T9*a*. Thus, the same reference numerals will be used to refer to the same or like parts as those described in the previous embodiment of FIGS. 2 and 3 and any repetitive explanation concerning the above elements will be omitted.

The eighth transistor T8*a* may include a control electrode which receives the second writing gate signal GW2*a*, the first electrode connected to the data voltage terminal, and the second electrode connected to the fourth node N4.

The ninth transistor T9*a* may include a control electrode which receives the second writing gate signal GW2*a*, the first electrode which receives the second power supply voltage VDD2, and the second electrode connected to the fifth node N5.

A type of the eighth transistor T8*a* and a type of the ninth transistor T9*a* may be different from each other.

In an embodiment, the eighth transistor T8*a* may be implemented as the NMOS transistor and the ninth transistor T9*a* may be implemented as the PMOS transistor.

In the first to third periods DR1 to DR3, the fifth period DR5, and the sixth period DR6, the second writing gate signal GW2*a* may have the deactivation level for the eighth transistor T8*a* and may have the activation level for the ninth transistor T9*a*. For example, in the first to third periods DR1 to DR3, the fifth period DR5, and the sixth period DR6, the second writing gate signal GW2*a* may have the low level.

The eighth transistor T8*a* may be turned off by the second writing gate signal GW2*a* and the ninth transistor T9*a* may be turned on by the second writing gate signal GW2*a* in the first to third periods DR1 to DR3, the fifth period DR5, and the sixth period DR6.

In the fourth period DR4, the second writing gate signal GW2*a* may have the activation level for the eighth transistor T8*a* and may have the deactivation level for the ninth transistor T9*a*. For example, the second writing gate signal GW2*a* may have the high level in the fourth period DR4.

The eighth transistor T8*a* may be turned on by the second writing gate signal GW2*a* and the ninth transistor T9*a* may be turned off by the second writing gate signal GW2*a* in the fourth period DR4. The eighth transistor T8*a* may transmit the constant-current voltage VCCG to the fourth node N4.

In some aspects, in the first to fourth periods DR1 to DR4, the emission signal EMa may have the deactivation level. For example, the emission signal EMa may have the high level. In the fifth period DR5 and the sixth period DR6, the emission signal EMa may have the activation level. For example, the emission signal EMa may have the low level.

As the second writing gate signal GW2*a* is applied to the control electrode of the ninth transistor T9*a*, a time for internal compensation for the threshold voltage of the seventh transistor T7 may be decreased. In some aspects, as the emission signal EMa maintains the deactivation level in the third period DR3, the level of the emission signal EMa may not be changed. Accordingly, the power consumption of the display device 1, which is consumed by changing the level of the emission signal EMa, may be reduced.

Figure 15:
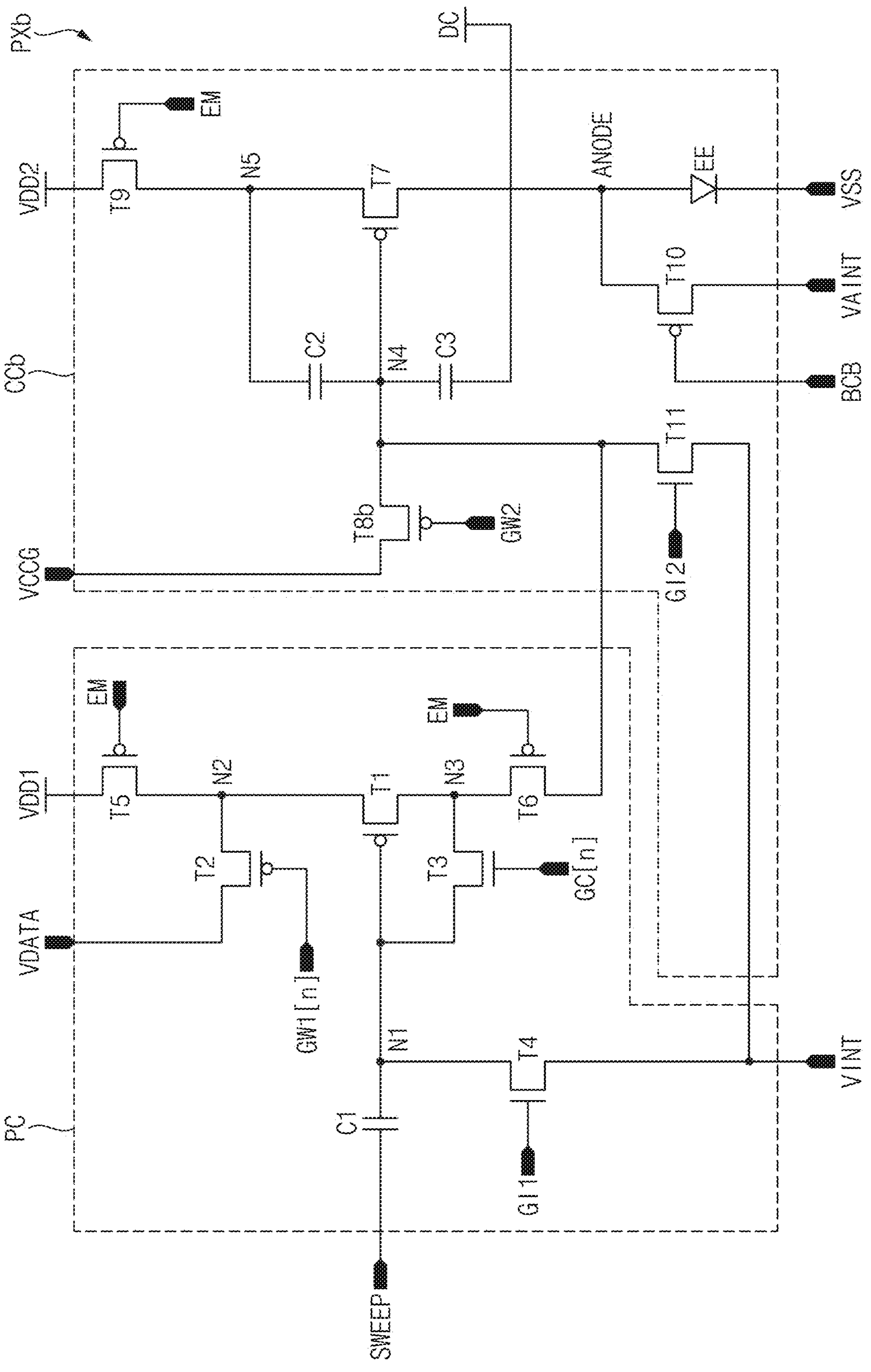
FIG. 15 is a circuit diagram illustrating an embodiment of a pixel circuit included in the display panel of the display device of FIG. 1.
Figure 16:
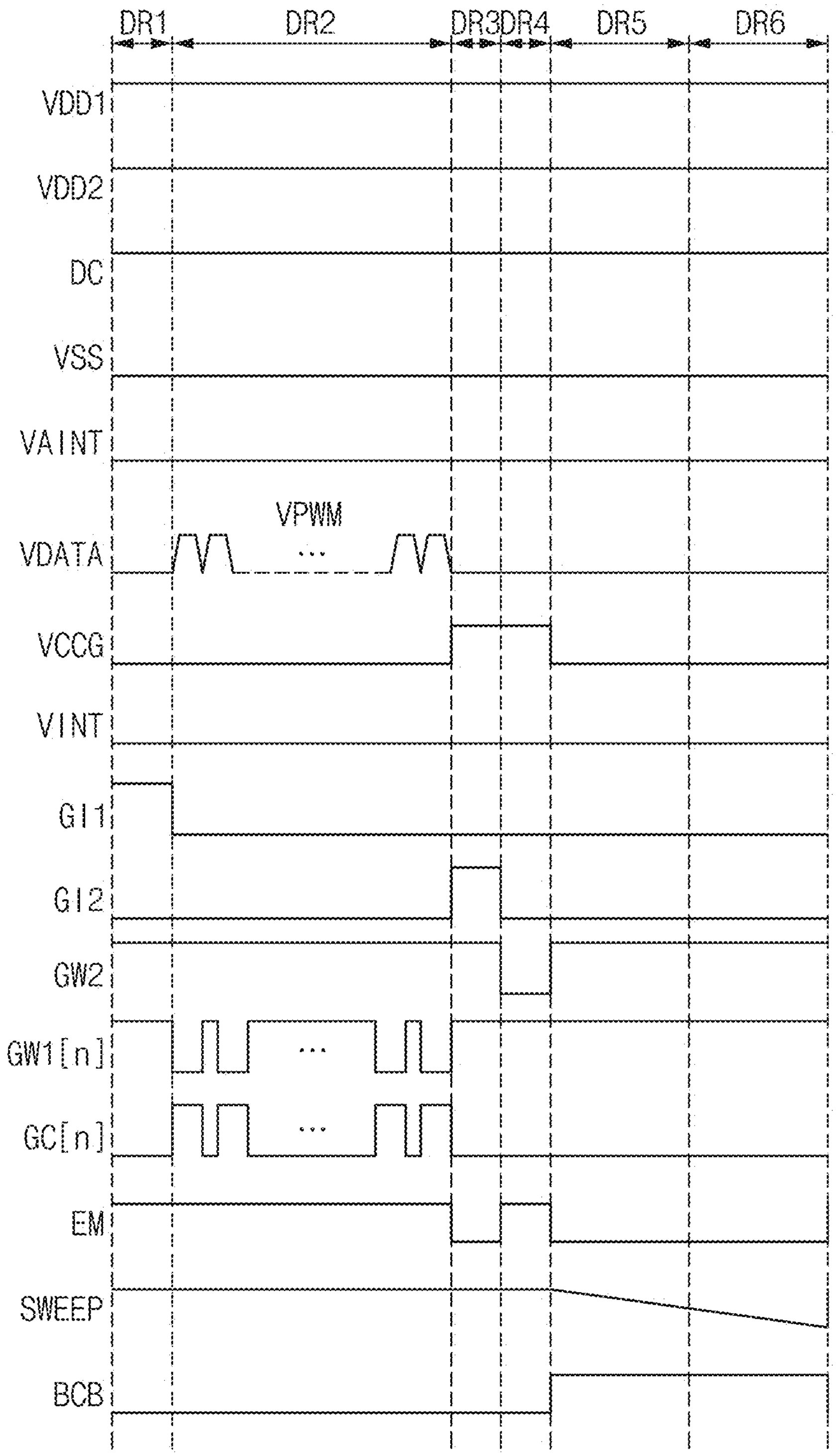
FIG. 16 is a timing diagram illustrating an operation of the pixel circuit of FIG. 15.

FIG. 15 is a circuit diagram illustrating an embodiment of a pixel circuit PXb included in the display panel 100 of the display device 1 of FIG. 1. FIG. 16 is a timing diagram illustrating an operation of the pixel circuit PXb of FIG. 15.

Referring to FIGS. 15 and 16, the pixel circuit PXb may include the first circuit PC and a second circuit CCb.

The first circuit PC may include first to sixth transistors T1 to T6 and the first capacitor C1. The second circuit CCb may include seventh to eleventh transistors T7 to T8, the second capacitor C2, and the third capacitor C3. The second circuit CCb may include light emitting element EE.

The pixel circuit PXb of FIG. 15 and the timing diagram of FIG. 16 are substantially the same as the pixel circuit PX of FIG. 2 and the timing diagram of FIG. 3 except for the eighth transistor T8*b* and a data voltage VDATA. Thus, the same reference numerals will be used to refer to the same or like parts as those described in the previous embodiment of FIGS. 2 and 3 and any repetitive explanation concerning the above elements will be omitted.

The eighth transistor T8*b* may include the control electrode which receives the second writing gate signal GW2, a first electrode connected to a constant-current voltage terminal, and the second electrode connected to the fourth node N4.

The constant-current voltage VCCG may be applied to the constant-current voltage terminal. The constant-current voltage terminal may be distinguished from the data voltage terminal.

The data voltage VDATA, which is applied to the data voltage terminal, may have one of a first data voltage level and a second data voltage level. For example, the data voltage VDATA having the first data voltage level may be the PWM data voltage VPWM and the data voltage VDATA having the second data voltage level may be the low voltage.

The data voltage VDATA, which is applied to the data voltage terminal, may have the second data voltage level in the first period DR1 and the third to sixth periods DR3 to DR6. That is, the data voltage VDATA may be the low voltage in the first period DR1 and the third to sixth periods DR3 to DR6. In some aspects, the data voltage VDATA, which is applied to the data voltage terminal, may have the first data voltage level in the second period DR2. The data voltage VDATA may be the PWM data voltage VPWM in the second period DR2.

The constant-current voltage VCCG, which is applied to the constant-current voltage terminal, may have one of a first constant-current voltage level and a second constant-current voltage level.

The constant-current voltage VCCG, which is applied to the constant-current voltage terminal, may have the second constant-current voltage level in the first period DR1, the second period DR2, the fifth period DR5, and the sixth period DR6. In some aspects, the constant-current voltage VCCG, which is applied to the constant-current voltage terminal, may have the first constant-current voltage level in the third period DR3 and the fourth period DR4.

The eighth transistor T8*b* may be turned on in response to the second writing gate signal GW2 in the fourth period DR4. The eighth transistor T8*b* may transmit the constant-current voltage VCCG having the first constant-current voltage level to the fourth node N4.

As the constant-current voltage terminal is distinguished from the data voltage terminal, the constant-current voltage VCCG having the first constant-current voltage level may be applied to the pixel circuits PXb at different times for each pixel row. Accordingly, timing at which the pixel circuits PXb emit light may be different for the pixel rows. For example, the pixel circuits PXb may sequentially emit light.

Figure 17:
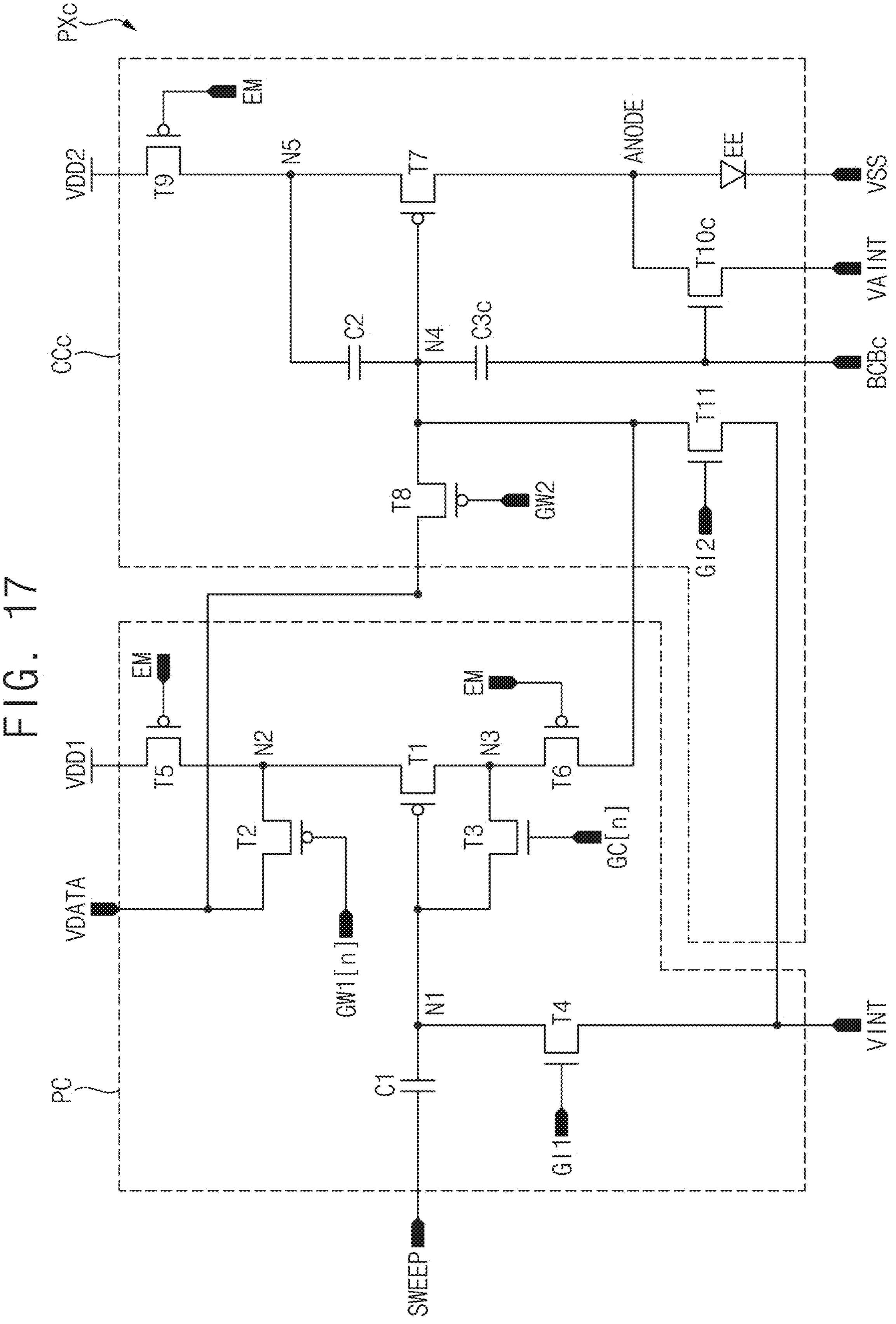
FIG. 17 is a circuit diagram illustrating an embodiment of a pixel circuit included in the display panel of the display device of FIG. 1.
Figure 18:
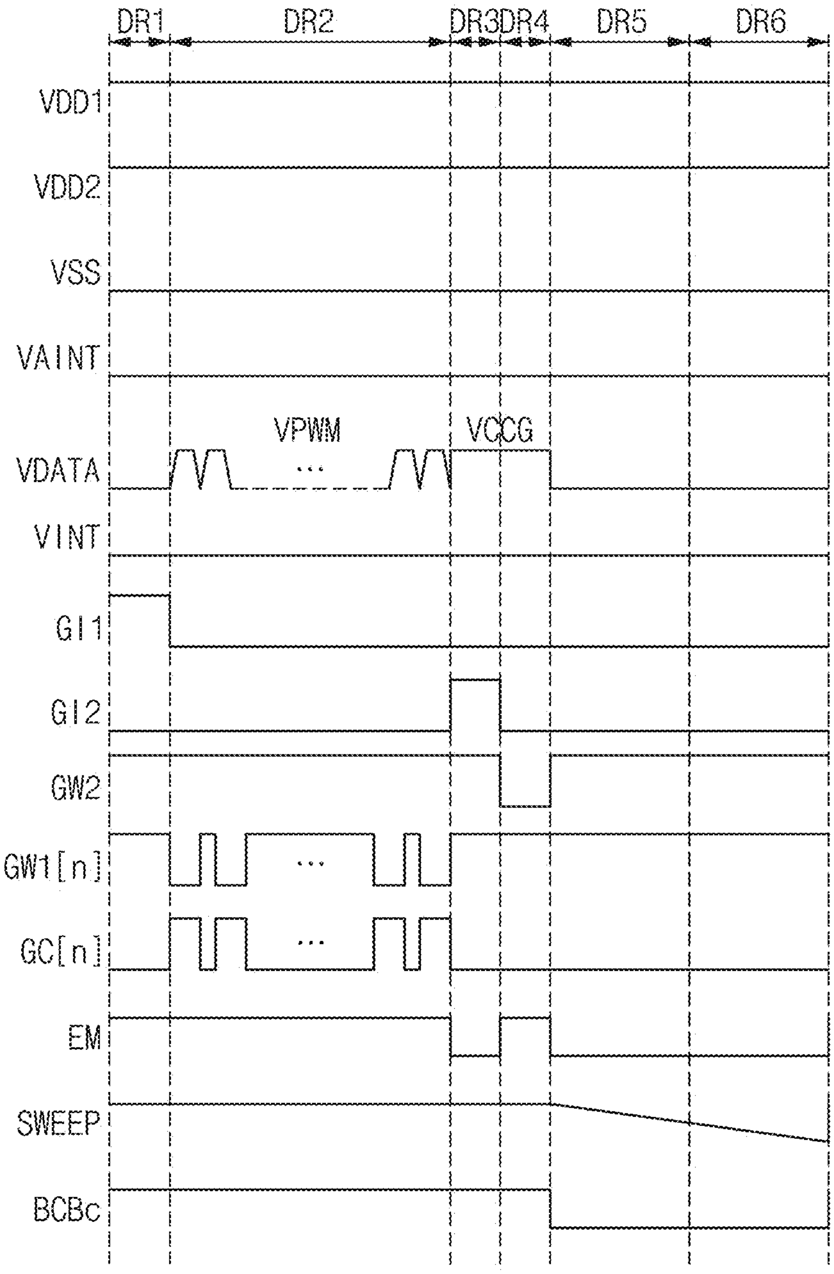
FIG. 18 is a timing diagram illustrating an operation of the pixel circuit of FIG. 17.

FIG. 17 is a circuit diagram illustrating an embodiment of a pixel circuit PXc included in the display panel 100 of the display device 1 of FIG. 1. FIG. 18 is a timing diagram illustrating an operation of the pixel circuit PXc of FIG. 17.

Referring to FIGS. 17 and 18, the pixel circuit PXc may include the first circuit PC and a second circuit control circuit.

The first circuit PC may include the first to sixth transistors T1 to T6 and the first capacitor C1. The second circuit control circuit may include seventh to eleventh transistors T7 to T11, the second capacitor C2, and a third capacitor C3*c*. The second circuit control circuit may include the light emitting element EE.

The pixel circuit PXc of FIG. 17 and the timing diagram of FIG. 18 are substantially the same as the pixel circuit PX of FIG. 2 and the timing diagram of FIG. 3 except for the tenth transistor T10*c* and a third initialization gate signal BCBc. Thus, the same reference numerals will be used to refer to the same or like parts as those described in the previous embodiment of FIGS. 2 and 3 and any repetitive explanation concerning the above elements will be omitted.

The tenth transistor T10*c* may include a control electrode which receives the third initialization gate signal BCBc, the first electrode connected to the anode of the light emitting element EE, and the second electrode which receives the second initialization voltage VAINT. In some aspects, the tenth transistor T10*c* may be implemented as the NMOS transistor.

The third capacitor C3*c* may include the first electrode connected to the fourth node N4 and a second electrode connected to the control electrode of the tenth transistor T10*c*. In some aspects, the second electrode of the third capacitor C3*c* may receives the third initialization gate signal BCBc.

In the first to fourth periods DR1 to DR4, the third initialization gate signal BCBc may have the activation level. For example, in the first to fourth periods DR1 to DR4, the third initialization gate signal BCBc may have the high level. In some aspects, in the fifth period DR5 and the sixth period DR6, the third initialization gate signal BCBc may have the deactivation level. For example, in the fifth period DR5 and the sixth period DR6, the third initialization gate signal BCBc may have the low level.

Accordingly, the tenth transistor T10*c* may be turned on in the first to fourth periods DR1 to DR4. The tenth transistor T10*c* may be turned off in the fifth period DR5 and the sixth period DR6.

The voltage of the fourth node N4 may be calculated by [Equation 2], "VCCG+(VDD2−(VCCG+Vth7)*(C2/(C2+C3)))−(VGL−VGH)*(C3/(C2+C3))", where the VCCG denotes the constant-current voltage VCCG, Vth7 denotes the threshold voltage of the seventh transistor T7, C2 denotes the capacitance of the second capacitor C2, C3 denotes the capacitance of the third capacitor C3*c*, VDD2 denotes the second power supply voltage VDD2, VGL denotes a first gate power supply voltage applied to the gate driver 300, and VGH denotes a second gate power supply voltage applied to the gate driver 300.

As the capacitance of the second capacitor C2 increases and the capacitance of the third capacitor C3*c* decreases, the internal compensation ability for the threshold voltage of the seventh transistor T7 may be improved. A level of the third initialization gate signal BCBc may be decreased from the high level to the low level in the fifth period DR5. A level of the voltage of the fourth node N4 may be lowered by coupling of the third capacitor C3*c*. In an example in which the capacitance of the second capacitor C2 increases and the capacitance of the third capacitor C3*c* decreases, applying a lower constant-current voltage VCCG to the fourth node N4 may reliably turn on the seventh transistor T7. The constant-current voltage VCCG, which is applied to the fourth node N4, may be further lowered by the coupling of the third capacitor C3*c* and the seventh transistor T7 may be reliably turned on. That is, as the voltage of the fourth node N4 is further lowered without relying on additionally generating the lower constant-current voltage VCCG, the power consumption of the display device 1 may be reduced or minimized.

Figure 19:
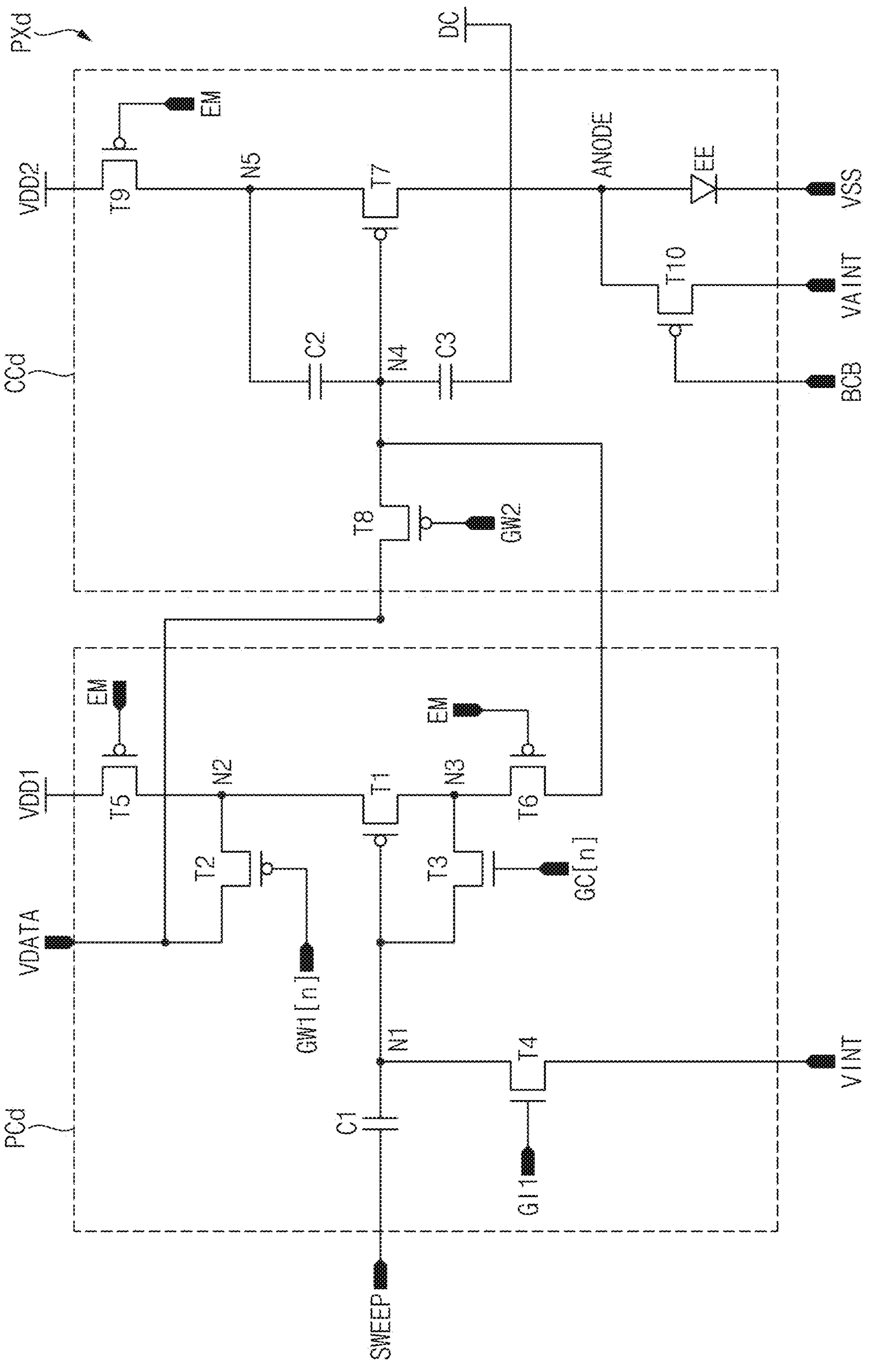
FIG. 19 is a circuit diagram illustrating an embodiment of a pixel circuit included in the display panel of the display device of FIG. 1.
Figure 20:
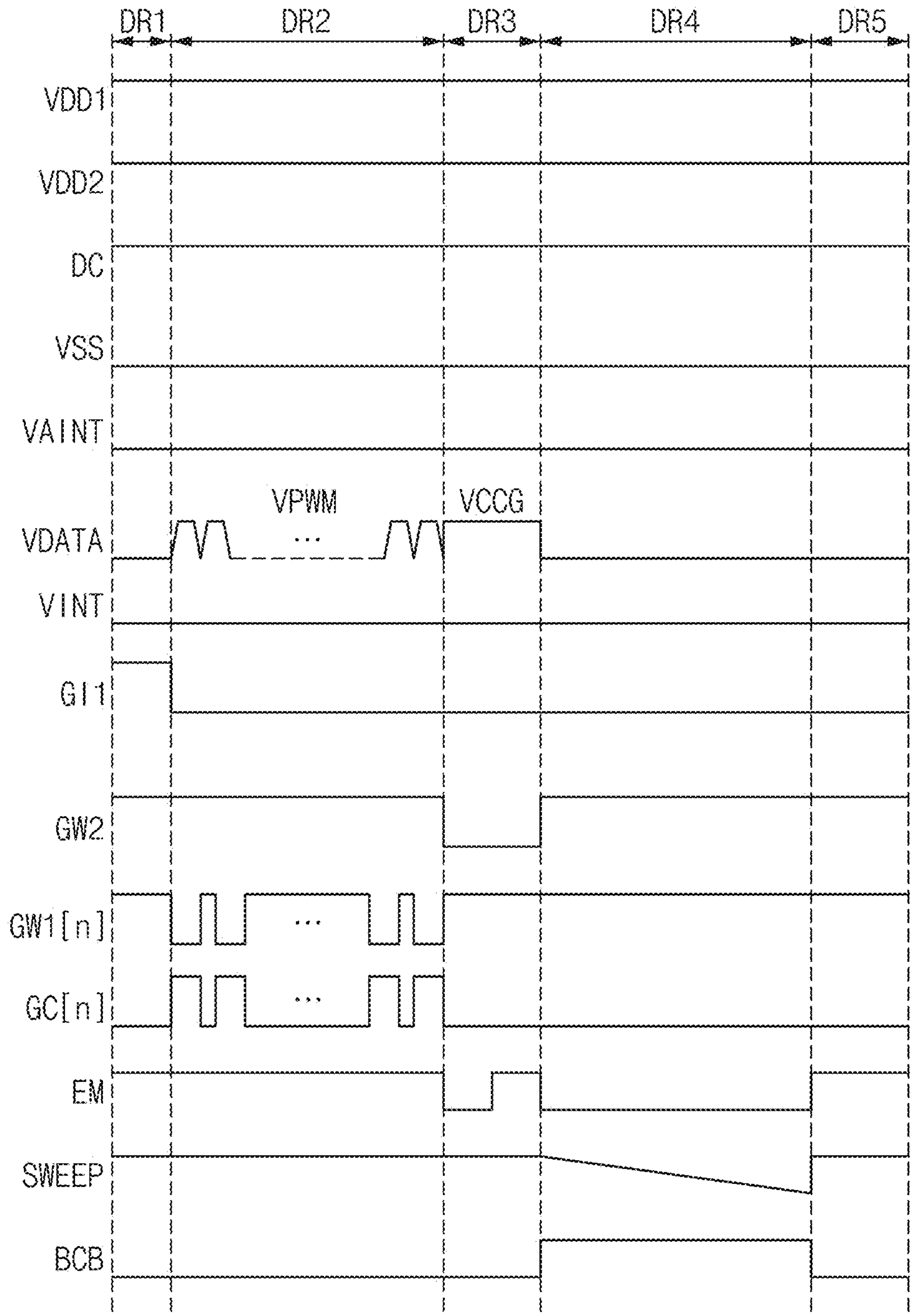
FIG. 20 is a timing diagram illustrating an operation of the pixel circuit of FIG. 19.

FIG. 19 is a circuit diagram illustrating an embodiment of a pixel circuit PXd included in the display panel 100 of the display device 1 of FIG. 1. FIG. 20 is a timing diagram illustrating an operation of the pixel circuit PXd of FIG. 19.

Referring to FIGS. 19 and 20, the pixel circuit PXd may include the first circuit PC and a second circuit CCd.

The first circuit PC may include the first to sixth transistors T1 to T6 and the first capacitor C1. The second circuit CCd may include the seventh to tenth transistor T7 to T10, the second capacitor C2, and the third capacitor C3. The second circuit CCd may include the light emitting element EE.

The pixel circuit PXd of FIG. 19 and the timing diagram of FIG. 20 are substantially the same as the pixel circuit PX of FIG. 2 and the timing diagram of FIG. 3 except that the pixel circuit PXd does not include the eleventh transistor T11 and a level of the second writing gate signal GW2 is different in the third period DR3. Thus, the same reference numerals will be used to refer to the same or like parts as those described in the previous embodiment of FIGS. 2 and 3 and any repetitive explanation concerning the above elements will be omitted.

The pixel circuit PXd may not include the eleventh transistor T11. In some aspects, the second writing gate signal GW2 may have the deactivation level in the first period DR1, the second period DR2, the fifth period DR5, and the sixth period DR6. For example, the second writing gate signal GW2 may have the high level in the first period DR1, the second period DR2, the fifth period DR5, and the sixth period DR6. In some aspects, the second writing gate signal GW2 may have the activation level in the third period DR3 and the fourth period DR4. For example, the second writing gate signal GW2 may have the low level in the third period DR3 and the fourth period DR4.

Accordingly, the pixel circuit PXd may include 10 transistors and 3 capacitors. The number of the transistors included in the pixel circuit PXd may be decreased compared to the pixel circuit PX of FIG. 2. As the number of the transistors included in the pixel circuit PXd is decreased, an integration density of the pixel circuit PXd included in the display panel 100 may bae increased.

Figure 21:
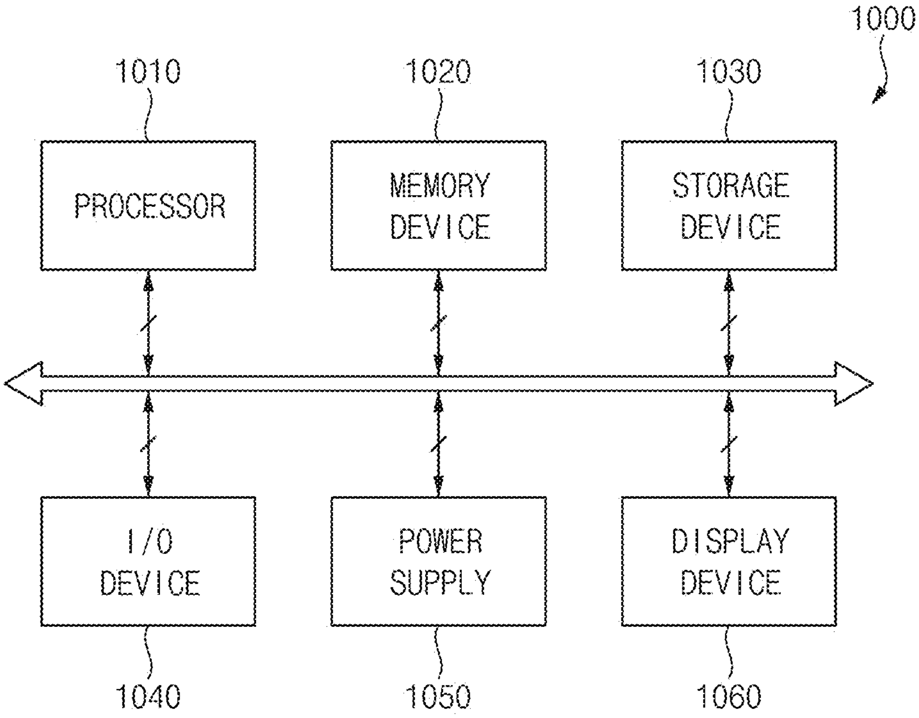
FIG. 21 is a block diagram illustrating an electronic device according to embodiments.
Figure 22:
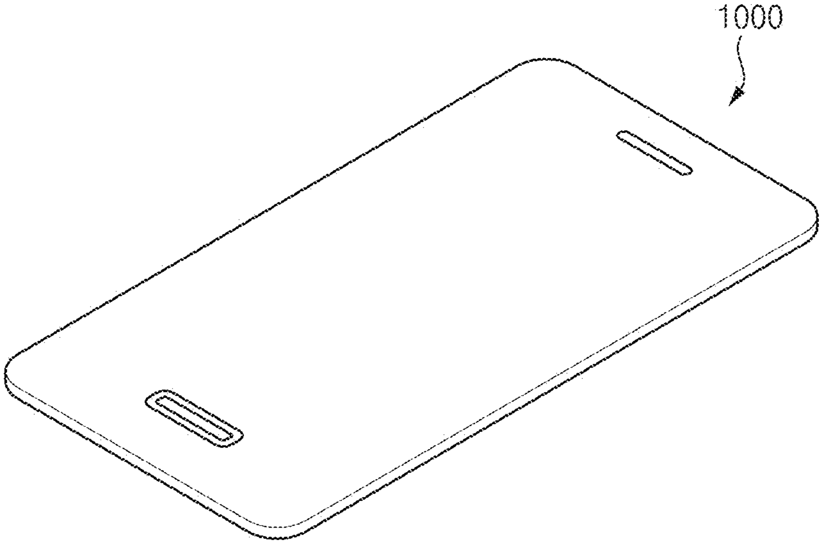
FIG. 22 is a diagram illustrating an example in which the electronic device of FIG. 21 is implemented as a smart phone.

FIG. 21 is a block diagram illustrating an electronic device 1000 according to embodiments. FIG. 22 is a diagram illustrating an example in which the electronic device 1000 of FIG. 21 is implemented as a smart phone.

Referring to FIGS. 21 and 22, the electronic device 1000 may include a processor 1010, a memory device 1020, a storage device 1030, an input/output (I/O) device 1040, a power supply 1050 and a display device 1060. The display device 1060 may be the display device 1 of FIG. 1. In some aspects, the electronic device 1000 may further include ports for communicating with a video card, a sound card, a memory card, a universal serial bus (USB) device, other electronic device, and the like.

In an embodiment, as illustrated in FIG. 22, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The processor 1010 may generate the input image data IMG and the input control signal CONT and may output the input image data IMG and the input control signal CONT to the driving controller 200 included in the display device 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. According to an embodiment, the I/O device 1040 may include the display device 1060.

The power supply 1050 may provide power for operations of the electronic device 1000.

The display device 1060 may be connected to other components through buses or other communication links.

In an embodiment, the display device 1060 may be the display device 1 of FIG. 1. The display panel 100 of the display device 1 may include the pixel circuits PX. The pixel circuit PX may include the first circuit PC and the second circuit CC. The first circuit PC may be the PWM block for performing the PWM operation. The second circuit CC may be the CCG block for generating the constant-current.

The pixel circuit PX may include 11 transistors and 3 capacitors. As the pixel circuit PX has relatively small number of transistors compared to the conventional pixel circuit, the integration density of the pixel circuits PX included in the display panel 100 may be increased. When the integration density of the pixel circuits PX is increased, the resolution of the display device 1 may be increased. Accordingly, the pixel circuit PX may be applicable to the ultra-high resolution display device.

In some aspects, as the PWM data voltage VPWM applied to the first electrode of the first transistor T1 included in the first circuit PC and the constant-current voltage VCCG applied to the control electrode of the seventh transistor T7 included in the second circuit PC are applied to the first circuit PC or the second circuit CC through the data voltage terminal, the number of the transistors and the number of the signal lines may be decreased. Accordingly, the dead space of the display device 1 may be decreased.

In some aspects, when the second electrode of the third capacitor C3 included in the second circuit CC is connected to the stabilization voltage terminal, the stabilization voltage DC, which is the constant voltage, may be applied to the second electrode of the third capacitor C3. Accordingly, the coupling of the third capacitor C3 may be prevented. Accordingly, the voltage of the fourth node N4 may be stabilized. Accordingly, the stability of the pixel circuit PX may be improved.

The present inventive concepts may be applied to a display device and an electronic device including the display device. For example, the present inventive concepts may be applied to a television (TV), a digital TV, a 3D TV, a mobile phone, a smart phone, a tablet computer, a laptop computer, a personal computer (PC), a household electronic device, a personal digital assistant (PDA), a portable multimedia player (PMP), a digital camera, a music player, a portable game console, a navigation device, and the like.

The foregoing is illustrative of the inventive concept and is not to be construed as limiting thereof. Although example embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A pixel circuit comprising:

a first circuit which performs a pulse width modulation operation based on a pulse width modulation data voltage;

a second circuit which generates a driving current based on a constant-current voltage; and a light emitting element which emits light based on the pulse width modulation data voltage and the constant-current voltage, wherein the first circuit comprises:

a first transistor comprising a control electrode connected to a first node, a first electrode connected to a second node, and a second electrode connected to a third node;

a second transistor which transmits the pulse width modulation data voltage to the second node; and a third transistor connected to the first node and the third node, and wherein the second circuit comprises:

a seventh transistor comprising a control electrode connected to a fourth node, a first electrode connected to a fifth node, and a second electrode connected to an anode of the light emitting element;

an eighth transistor which transmits the constant-current voltage to the fourth node; and a third capacitor comprising a first electrode connected to the fourth node and a second electrode which receives a stabilization voltage.

2. The pixel circuit of claim 1, wherein:

the second transistor comprises:

a control electrode which receives a first writing gate signal;

a first electrode connected to a data voltage terminal; and a second electrode connected to the third node, and the eighth transistor comprises:

a control electrode which receives a second writing gate signal;

a first electrode connected to the data voltage terminal; and a second electrode connected to the fourth node.

3. The pixel circuit of claim 1, wherein the second circuit further comprises a second capacitor comprising:

a first electrode connected to the fifth node; and a second electrode connected to the fourth node.

4. The pixel circuit of claim 1, wherein the second circuit further comprises a tenth transistor comprising:

a control electrode which receives a third initialization gate signal;

a first electrode connected to the anode of the light emitting element; and a second electrode which receives a second initialization voltage.

5. The pixel circuit of claim 4, wherein:

the second electrode of the third capacitor is connected to the control electrode of the tenth transistor, and the stabilization voltage is the third initialization gate signal.

6. The pixel circuit of claim 1, wherein the first circuit further comprises a fourth transistor comprising:

a control electrode which receives a first initialization gate signal;

a first electrode connected to the first node; and a second electrode which receives a first initialization voltage.

7. The pixel circuit of claim 1, wherein the first circuit further comprises a first capacitor comprising:

a first electrode which receives a sweep signal; and a second electrode connected to the first node.

8. The pixel circuit of claim 1, wherein the second circuit further comprises an eleventh transistor comprising:

a control electrode which receives a second initialization gate signal, a first electrode connected to the fourth node, and a second electrode which receives a first initialization voltage.

9. The pixel circuit of claim 1, wherein the first circuit further comprises:

a fifth transistor comprising:

a control electrode which receives an emission signal;

a first electrode which receives a first power supply voltage, and a second electrode connected to the second node;

a sixth transistor comprising:

a control electrode which receives the emission signal;

a first electrode connected to the third node; and a second electrode connected to the fourth node; and a ninth transistor comprising:

a control electrode;

a first electrode which receives a second power supply voltage; and a second electrode connected to the fifth node.

10. The pixel circuit of claim 9, wherein the control electrode of the ninth transistor receives the emission signal.

11. The pixel circuit of claim 9, wherein:

the eighth transistor comprises:

a control electrode which receives a second writing gate signal;

a first electrode connected to a data voltage terminal; and a second electrode connected to the fourth node, and the control electrode of the ninth transistor receives the second writing gate signal.

12. The pixel circuit of claim 1, wherein:

the second transistor comprises:

a control electrode which receives a first writing gate signal;

a first electrode connected to a data voltage terminal; and a second electrode connected to the second node, the third transistor comprises:

a control electrode which receives a compensation gate signal;

a first electrode connected to the first node; and a second electrode connected to the third node, the eighth transistor comprises:

a control electrode which receives a second writing gate signal;

a first electrode connected to the data voltage terminal; and a second electrode connected to the fourth node, the light emitting element comprises:

the anode; and a cathode which receives a third power supply voltage, the first circuit further comprises:

a fourth transistor comprising a control electrode which receives a first initialization gate signal, a first electrode connected to the first node, and a second electrode which receives a first initialization voltage;

a fifth transistor comprising a control electrode which receives an emission signal, a first electrode which receives a first power supply voltage, and a second electrode connected to the second node;

a sixth transistor comprising a control electrode which receives the emission signal, a first electrode connected to the third node, and a second electrode connected to the fourth node; and a first capacitor comprising a first electrode which receives a sweep signal and a second electrode connected to the first node, and the second circuit further comprises:

a ninth transistor comprising a control electrode which receives the emission signal, a first electrode which receives a second power supply voltage, and a second electrode connected to the fifth node;

a tenth transistor comprising a control electrode which receives a third initialization gate signal, a first electrode connected to the anode of the light emitting element, and a second electrode which receives a second initialization voltage;

an eleventh transistor comprising a control electrode which receives a second initialization gate signal, a first electrode connected to the fourth node, and a second electrode which receives the first initialization voltage; and a second capacitor comprising a first electrode connected to the fifth node and a second electrode connected to the fourth node.

13. The pixel circuit of claim 12, wherein in a first period, the first initialization gate signal has an activation level, the second initialization gate signal has a deactivation level, the third initialization gate signal has an activation level, the first writing gate signal has a deactivation level, the second writing gate signal has a deactivation level, the compensation gate signal has a deactivation level, the emission signal has a deactivation level, and the sweep signal has a high level.

14. The pixel circuit of claim 12, wherein:

in a second period, the first initialization gate signal has a deactivation level, the second initialization gate signal has a deactivation level, the third initialization gate signal has an activation level, the first writing gate signal has an activation level, the second writing gate signal has a deactivation level, the compensation gate signal has an activation level, the emission signal has a deactivation level, the sweep signal has a high level, and a data voltage, which is applied to the data voltage terminal, has a first level, and the data voltage having the first level is the pulse width modulation data voltage.

15. The pixel circuit of claim 12, wherein:

in a third period, the first initialization gate signal has a deactivation level, the second initialization gate signal has an activation level, the third initialization gate signal has an activation level, the first writing gate signal has a deactivation level, the second writing gate signal has a deactivation level, the compensation gate signal has a deactivation level, the emission signal has an activation level, the sweep signal has a high level, and a data voltage, which is applied to the data voltage terminal, has a second level, and the data voltage having the second level is the constant-current voltage.

16. The pixel circuit of claim 12, wherein:

in a fourth period, the first initialization gate signal has a deactivation level, the second initialization gate signal has a deactivation level, the third initialization gate signal has an activation level, the first writing gate signal has a deactivation level, the second writing gate signal has an activation level, the compensation gate signal has a deactivation level, the emission signal has a deactivation level, the sweep signal has a high level, and a data voltage, which is applied to the data voltage terminal, has a second level, and the data voltage having the second level is the constant-current voltage.

17. The pixel circuit of claim 12, wherein in a fifth period and a sixth period, the first initialization gate signal has a deactivation level, the second initialization gate signal has a deactivation level, the third initialization gate signal has a deactivation level, the first writing gate signal has a deactivation level, the second writing gate signal has a deactivation level, the compensation gate signal has a deactivation level, the emission signal has an activation level, and the sweep signal gradually decreases from a high level.

18. A display device comprising:

a display panel comprising a pixel circuit;

a gate driver which provides a gate signal to the pixel circuit;

an emission driver which provides an emission signal to the pixel circuit; and a data driver which provides a data voltage to the pixel circuit, wherein the pixel circuit comprises:

a first circuit which performs a pulse width modulation operation based on a pulse width modulation data voltage;

a second circuit which generates a driving current based on a constant-current voltage; and a light emitting element which emits light based on the pulse width modulation data voltage and the constant-current voltage, wherein the first circuit comprises:

a first transistor comprising a control electrode connected to a first node, a first electrode connected to a second node, and a second electrode connected to a third node;

a second transistor which transmits the pulse width modulation data voltage to the second node; and a third transistor connected to the first node and the third node, and wherein the second circuit comprises:

a seventh transistor comprising a control electrode connected to a fourth node, a first electrode connected to a fifth node, and a second electrode connected to an anode of the light emitting element;

an eighth transistor which transmits the constant-current voltage to the fourth node; and a third capacitor comprising a first electrode connected to the fourth node and a second electrode which receives a stabilization voltage.

19. The display device of claim 18, wherein:

the second transistor comprises:

a control electrode which receives a first writing gate signal;

a first electrode which receives the data voltage; and a second electrode connected to the second node, the third transistor comprises:

a control electrode which receives a compensation gate signal;

a first electrode connected to the first node; and a second electrode connected to the third node, the eighth transistor comprises:

a control electrode which receives a second writing gate signal;

a first electrode which receives the data voltage; and a second electrode connected to the fourth node, the light emitting element comprises:

the anode; and a cathode which receives a third power supply voltage, the first circuit further comprises:

a fourth transistor comprising a control electrode which receives a first initialization gate signal, a first electrode connected to the first node, and a second electrode which receives a first initialization voltage;

a fifth transistor comprising a control electrode which receives the emission signal, a first electrode which receives a first power supply voltage, and a second electrode connected to the second node;

a sixth transistor comprising a control electrode which receives the emission signal, a first electrode connected to the third node, and a second electrode connected to the fourth node; and a first capacitor comprising a first electrode which receives a sweep signal and a second electrode connected to the first node, and the second circuit further comprises:

a ninth transistor comprising a control electrode which receives the emission signal, a first electrode which receives a second power supply voltage, and a second electrode connected to the fifth node;

a tenth transistor comprising a control electrode which receives a third initialization gate signal, a first electrode connected to the anode of the light emitting element, and a second electrode which receives a second initialization voltage;

an eleventh transistor comprising a control electrode which receives a second initialization gate signal, a first electrode connected to the fourth node, and a second electrode which receives the first initialization voltage; and a second capacitor comprising a first electrode connected to the fifth node and a second electrode connected to the fourth node.

20. An electronic device comprising:

a processor which generates an input control signal and input image data;

a display panel comprising a pixel circuit; and a display panel driver which operates the display panel based on the input control signal and the input image data, wherein the pixel circuit comprises:

a first circuit which performs a pulse width modulation operation based on a pulse width modulation data voltage;

a second circuit which generates a driving current based on a constant-current voltage; and a light emitting element which emits light based on the pulse width modulation data voltage and the constant-current voltage, wherein the first circuit comprises:

a first transistor comprising a control electrode connected to a first node, a first electrode connected to a second node, and a second electrode connected to a third node;

a second transistor which transmits the pulse width modulation data voltage to the second node; and a third transistor connected to the first node and the third node, and wherein the second circuit comprises:

a seventh transistor comprising a control electrode connected to a fourth node, a first electrode connected to a fifth node, and a second electrode connected to an anode of the light emitting element;

an eighth transistor which transmits the constant-current voltage to the fourth node; and a third capacitor comprising a first electrode connected to the fourth node and a second electrode which receives a stabilization voltage.

* * * * *